United States Patent
Kim et al.

(10) Patent No.: US 10,251,167 B2
(45) Date of Patent: Apr. 2, 2019

(54) D2D SIGNAL TRANSMISSION METHOD AND USER EQUIPMENT

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 150 days.

(21) Appl. No.: 14/902,425

(22) PCT Filed: Jul. 1, 2014

(86) PCT No.: PCT/KR2014/005852
§ 371 (c)(1),
(2) Date: Dec. 31, 2015

(87) PCT Pub. No.: WO2015/002433
PCT Pub. Date: Jan. 8, 2015

(65) Prior Publication Data
US 2016/0374068 A1 Dec. 22, 2016

Related U.S. Application Data

(60) Provisional application No. 61/841,895, filed on Jul. 1, 2013, provisional application No. 61/843,886, filed on
(Continued)

(51) Int. Cl.
*H04W 72/04* (2009.01)
*H04W 4/06* (2009.01)
(Continued)

(52) U.S. Cl.
CPC ........... *H04W 72/042* (2013.01); *H04W 4/06* (2013.01); *H04W 4/70* (2018.02); *H04W 72/005* (2013.01);
(Continued)

(58) Field of Classification Search
CPC ... H04W 4/005; H04W 84/20; H04W 72/121; H04W 74/0833; H04W 84/18; H04L 5/0066
See application file for complete search history.

(56) References Cited

U.S. PATENT DOCUMENTS

| 7,548,758 B2 | 6/2009 | Periyalwar et al. |
| 2009/0017807 A1 | 1/2009 | Kwon et al. |

(Continued)

FOREIGN PATENT DOCUMENTS

| CN | 101689917 | 3/2010 |
| CN | 101690134 | 3/2010 |

(Continued)

OTHER PUBLICATIONS

PCT International Application No. PCT/KR2014/005860, Written Opinion of the International Searching Authority dated Nov. 27, 2014, 24 pages.

(Continued)

*Primary Examiner* — Jae Y Lee
*Assistant Examiner* — Aixa A Guadalupe Cruz
(74) *Attorney, Agent, or Firm* — Lee Hong Degerman Kang & Waimey

(57) ABSTRACT

The present invention provides a method whereby user equipment located outside network coverage or in partial network coverage performs device-to-device (D2D) communication. The user equipment, which has a D2D signal to transmit, can send a request for resource allocation for the transmission of the D2D signal to user equipment configured as a cluster head, or become a cluster head itself. The user equipment, which has the D2D signal to transmit, can transmit the D2D signal according to the resource allocation by the cluster head or resource allocation performed by becoming a cluster head itself. Other user equipment (Continued)

receives the D2D signal by receiving or overhearing information on the resource allocation from the cluster head.

8 Claims, 15 Drawing Sheets

Related U.S. Application Data on Jul. 8, 2013, provisional application No. 61/843,889, filed on Jul. 8, 2013, provisional application No. 61/843,463, filed on Jul. 8, 2013, provisional application No. 61/843,888, filed on Jul. 8, 2013.

(51) Int. Cl.
*H04W 74/08* (2009.01)
*H04W 72/00* (2009.01)
*H04W 4/70* (2018.01)
*H04W 76/14* (2018.01)

(52) U.S. Cl.
CPC ....... *H04W 72/04* (2013.01); *H04W 72/0406* (2013.01); *H04W 72/048* (2013.01); *H04W 74/0833* (2013.01); *H04W 76/14* (2018.02)

(56) References Cited

U.S. PATENT DOCUMENTS

| | | | |
|---|---|---|---|
| 2009/0017843 | A1 | 1/2009 | Laroia et al. |
| 2010/0067427 | A1 | 3/2010 | Choudhury |
| 2011/0182280 | A1 | 7/2011 | Charbit et al. |
| 2011/0275382 | A1 | 11/2011 | Hakola et al. |
| 2012/0213183 | A1 | 8/2012 | Chen et al. |
| 2013/0039314 | A1 | 2/2013 | Prateek et al. |
| 2013/0053084 | A1 | 2/2013 | Cho et al. |
| 2013/0157670 | A1 | 6/2013 | Koskela et al. |
| 2013/0260801 | A1 | 10/2013 | Kim et al. |
| 2014/0010172 | A1 | 1/2014 | Wei et al. |
| 2014/0169261 | A1 | 6/2014 | Ming et al. |
| 2014/0213306 | A1 | 7/2014 | Blankenship et al. |
| 2014/0286284 | A1 | 9/2014 | Lim et al. |
| 2014/0304383 | A1* | 10/2014 | Guo .............. H04W 4/70 709/223 |
| 2014/0307611 | A1 | 10/2014 | Tesanovic et al. |
| 2014/0307642 | A1* | 10/2014 | Wanstedt ........... H04W 76/023 370/329 |
| 2015/0071189 | A1 | 3/2015 | Park et al. |
| 2015/0133132 | A1 | 5/2015 | Li et al. |
| 2015/0181546 | A1 | 6/2015 | Freda et al. |
| 2015/0334756 | A1 | 11/2015 | Lu et al. |
| 2015/0341971 | A1 | 11/2015 | Fodor et al. |
| 2015/0373616 | A1 | 12/2015 | Fujishiro |
| 2016/0143077 | A1* | 5/2016 | Fodor ................ H04W 84/20 370/329 |

FOREIGN PATENT DOCUMENTS

| | | |
|---|---|---|
| CN | 102165840 | 8/2011 |
| CN | 103238282 | 8/2013 |
| JP | 2008505591 | 2/2008 |
| JP | 2014207669 | 10/2014 |
| KR | 1020090005647 | 1/2009 |
| KR | 1020120074251 | 5/2012 |
| KR | 1020120061739 | 6/2012 |
| KR | 1020120062898 | 6/2012 |
| KR | 1020100043227 | 11/2012 |
| KR | 1020130048710 | 5/2013 |
| KR | 1020130065225 | 6/2013 |
| WO | 2012/046173 | 4/2012 |
| WO | 2012/074257 | 6/2012 |
| WO | 2012111911 | 8/2012 |
| WO | 2012/159270 | 11/2012 |
| WO | 2013/013510 | 1/2013 |
| WO | 2013025040 | 2/2013 |
| WO | 2013062310 | 5/2013 |
| WO | 2013091229 | 6/2013 |

OTHER PUBLICATIONS

PCT International Application No. PCT/KR2014/005859, Written Opinion of the International Searching Authority dated Oct. 14, 2014, 20 pages.
PCT International Application No. PCT/KR2014/005858, Written Opinion of the International Searching Authority dated Sep. 29, 2014, 16 pages.
U.S. Appl No. 14/899,513, Office Action dated Mar. 23, 2017, 26 pages.
European Patent Office Application Serial No. 14819642.1, Search Report dated Jan. 3, 2017, 13 pages.
Huawei, "Physical layer options for D2D discovery", R1-131864, 3GPP TSG RAN WG1 Meeting #73, May 2013, 8 pages.
U.S. Appl. No. 14/896,274, Notice of Allowance dated Nov. 8, 2016, 10 pages.
PCT International Application No. PCT/KR2014/005852, Written Opinion of the International Searching Authority dated Oct. 13, 2014, 20 pages.
The State Intellectual Property Office of the People's Republic of China Application Serial No. 201480037898.8, Office Action dated Mar. 20, 2018, 29 pages.
U.S. Appl. No. 14/902,490, Office Action dated Jan. 26, 2018, 15 pages.

\* cited by examiner though communication with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

D2D SIGNAL TRANSMISSION METHOD AND USER EQUIPMENT

CROSS-REFERENCE TO RELATED APPLICATIONS

This application is the National Stage filing under 35 U.S.C. 371 of International Application No. PCT/KR2014/005852, filed on Jul. 1, 2014, which claims the benefit of U.S. Provisional Application No. 61/841,895, filed on Jul. 1, 2013, 61/843,886, filed on Jul. 8, 2013, 61/843,889, filed on Jul. 8, 2013, 61/843,463, filed on Jul. 8, 2013, and 61/843,888, filed on Jul. 8, 2013, the contents of which are all hereby incorporated by reference herein in their entirety.

TECHNICAL FIELD

The present invention relates to a wireless communication system and, more particularly, a method for transmitting and/or receiving a signal using device-to-device (D2D) communication in a wireless communication system and an apparatus for the same.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary wireless communication system.

An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, see Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

The UE is fixed or mobile. The UE is a device that transmits and receives user data and/or various kinds of control information though communication with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

One or more cells are managed by one eNB. A cell is configured to use one of bandwidths of 1.25, 2.5, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. For DL data, the eNB transmits DL scheduling information to notify a corresponding UE of time/frequency resources through which the data is to be transmitted, coding, data size, and hybrid automatic repeat and request (HARQ)-related information. For UL data, the eNB transmits UL scheduling information to a corresponding UE to inform the UE of available time/frequency resources, coding, data size, and HARQ-related information. An interface for transmitting user traffic or control traffic between eNBs may be used. A core network (CN) may include an AG and a network node for user registration for the UE. The AG manages mobility of the UE on a tracking area (TA) basis, each TA including a plurality of cells.

Conventionally, the legacy LTE communication scheme mainly considers wireless communication between an eNB and a UE. However, demands for technology enabling direct communication between UEs have recently increased.

FIG. 2 is a conceptual diagram illustrating direct communication between UEs.

Referring to FIG. 2, UE-to-UE direct communication is performed between UE1 and UE2 and between UE3 and UE4. The eNB may control positions of the time/frequency resources, transmit power and the like for direct communication between UEs through a proper control signal. Direct communication between UEs is referred to as device-to-device (D2D) communication in the following description.

D2D communication has different requirements from legacy LTE communication in many aspects.

DISCLOSURE

Technical Problems

An object of the present invention devised to solve the problem lies in a method for transmitting and/or receiving a signal using direct communication between UEs in a wireless communication system and an apparatus for the same.

The technical objects that can be achieved through the present invention are not limited to what has been particularly described hereinabove and other technical objects not described herein will be more clearly understood by persons skilled in the art from the following detailed description.

Technical Solutions

The object of the present invention can be achieved by providing a method for performing device-to-device (D2D) communication by a user equipment (UE) positioned outside a network. A UE having a D2D signal to transmit may make a request to a UE configured as a cluster head for a resource assignment for transmission of the D2D signal. Alternatively, the UE having a D2D signal to transmit may become the cluster head. The UE having a D2D signal to transmit may transmit the D2D signal according to the resource assignment performed by the cluster head or performed by the UE having become the cluster head. Other UEs receives the D2D signal by receiving or overhearing resource assignment information from the cluster head.

In one aspect of the present invention, provided herein is a method for transmitting a D2D signal by a UE positioned outside a network, the method including transmitting a first message to a cluster head of a cluster containing a plurality of UEs using a preconfigured resource, receiving, from the cluster head, a second message containing control information for transmission of the D2D signal, and transmitting the D2D signal based on the control information.

In another aspect of the present invention, provided herein is a user equipment (UE) for transmitting a device-to-device (D2D) signal, the UE being positioned outside a network and including a radio frequency (RF) unit and a processor configured to control the RF unit, wherein the processor is configured to control the RF unit to transmit a first message to a cluster head of a cluster containing a plurality of UEs using a preconfigured resource, to receive, from the cluster head, a second message containing control information for transmission of the D2D signal, and to broadcast the D2D signal based on the control information.

In another aspect of the present invention, provided herein is a method for transmitting a device-to-device (D2D) signal by a user equipment (UE) positioned outside a network, the method including transmitting a cluster head decision signal containing an indicator indicating that the UE desires to become a cluster head of a cluster containing a plurality of UEs, transmitting a second message containing control information for transmission of the D2D signal, and transmitting the D2D signal based on the control information.

In another aspect of the present invention, provided herein is a user equipment (UE) for transmitting a device-to-device (D2D) signal, the UE being positioned outside a network and including a radio frequency (RF) unit and a processor configured to control the RF unit, wherein the processor is configured to control the RF unit to transmit a cluster head decision signal containing an indicator indicating that the UE desires to become a cluster head of a cluster containing a plurality of UEs, to transmit a second message containing control information for transmission of the D2D signal, and to transmit the D2D signal based on the control information.

In the respective aspects of the present invention, the first message or the cluster head decision signal may be transmitted using a reserved preamble sequence.

In the respective aspects of the present invention, the reserved preamble sequence may be longer than a random transmission preamble sequence In the respective aspects of the present invention, the cluster head decision signal may contain a priority level corresponding to the D2D signal.

In the respective aspects of the present invention, the UE or the cluster head having transmitted the cluster head decision signal may further transmit information announcing generation of the cluster.

In the respective aspects of the present invention, the UE or the cluster head having transmitted the cluster head decision signal may further transmit On or Off duration information of the cluster.

In the respective aspects of the present invention, the D2D signal may be broadcast.

In the respective aspects of the present invention, the D2D signal may be a signal corresponding to an emergency call.

In another aspect of the present invention, provided herein are a method including receiving the first message or the cluster head decision signal, receiving a second message, and receiving the D2D signal based on the control information contained in the second message, and a user equipment (UE) for implementing the same.

The above technical solutions are merely some parts of the embodiments of the present invention and various embodiments into which the technical features of the present invention are incorporated can be derived and understood by persons skilled in the art from the following detailed description of the present invention.

Advantageous Effect

According to embodiments of the present invention, direct communication between UEs may be performed in a wireless communication system while interference is efficiently attenuated.

In addition, D2D may be not only performed within network coverage but also efficiently performed outside the network coverage and/or in a partial network.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
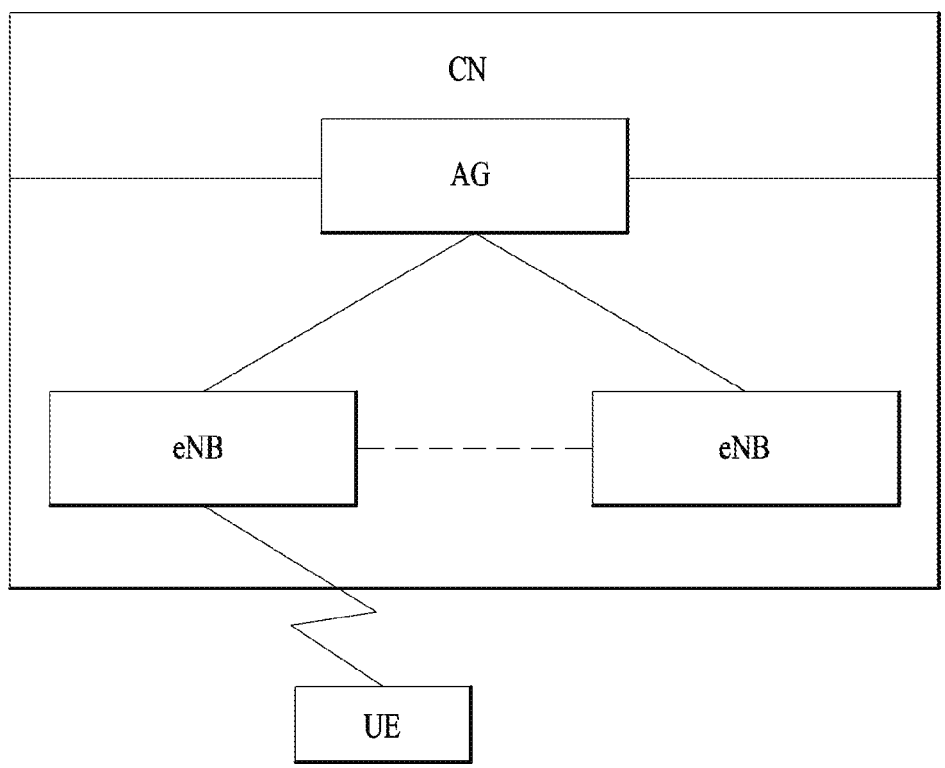
FIG. 1 illustrates a network structure of an E-UMTS as an exemplary wireless communication system.
Figure 2:
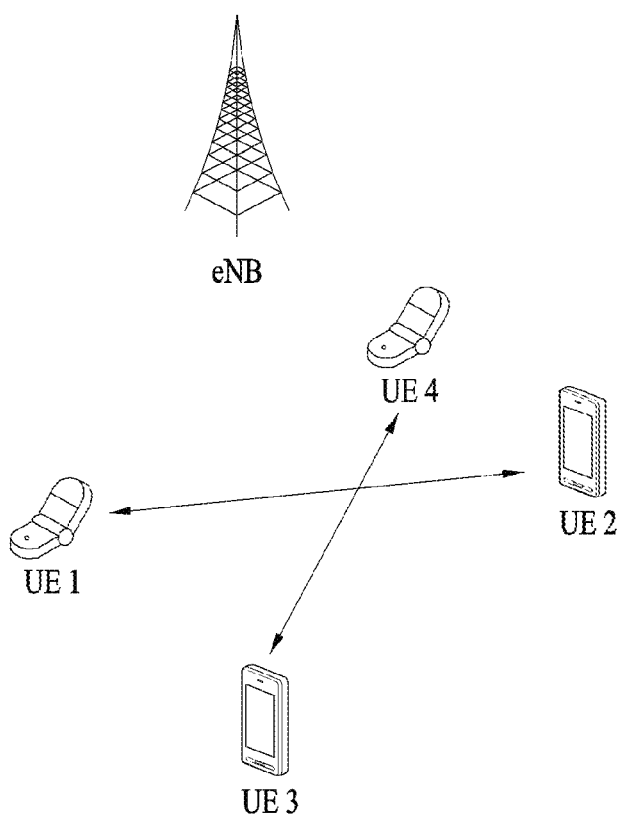
FIG. 2 is a conceptual diagram illustrating direct communication between UEs, namely device-to-device (D2D) communication.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). The CCs may or may not be adjacent to each other in the frequency domain.

The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. In frequency division duplex (FDD), since the UL operation band is different from the DL operation band, different carrier frequencies are linked to constitute one cell, and SIB2 linkage designates, as a frequency of a UL CC, a frequency different form the frequency of a DL CC which the UE accesses. In other words, in the case of FDD, in a cell constituted by a DL CC and a UL CC linked to the DL CC, the DL CC and the UL CC operate at different frequencies. In time division duplex (TDD), the UL operation band is identical to the DL operation band. Accordingly, one carrier frequency constitutes one cell, and SIB2 linkage designates the frequency of a DL CC which the UE accesses as the frequency of a corresponding.

In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

As described above, to efficiently perform D2D communication, radio resources for UE-to-UE communication need to be efficiently allocated. Particularly, a method for quickly transmitting a signal without delay in emergency is required for D2D communication. The present invention proposes a method to satisfy this requirement.

To this end, operations in an LTE system to which the present invention is applicable will be reviewed and then a method for efficiently performing D2D communication using a random access procedure (also referred to as a random access channel (RACH) procedure) in the LTE system will be proposed.

Figure 3:
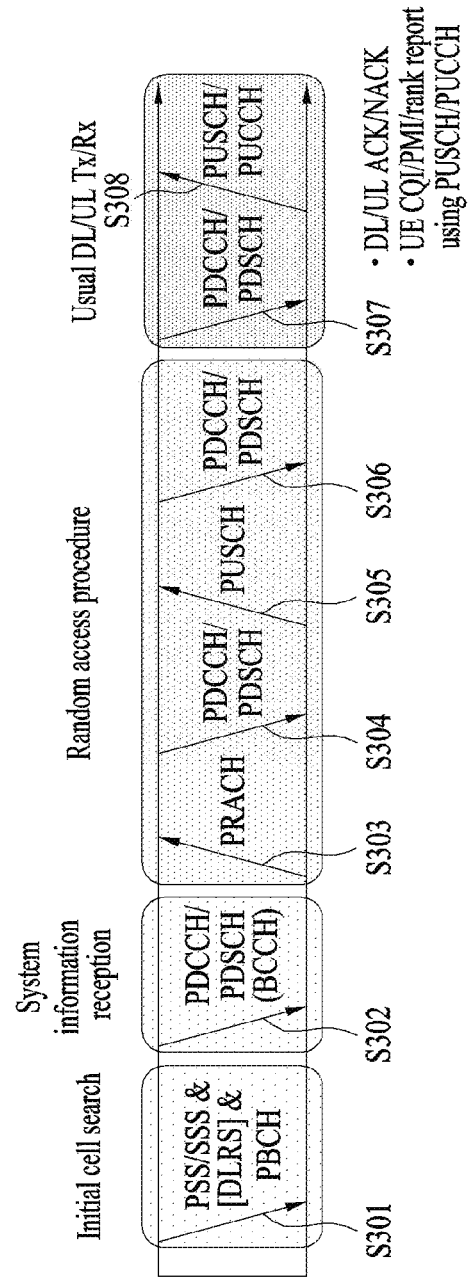
FIG. 3 illustrates physical channels used in a 3GPP system and a general signal transmission method using the same.

FIG. 3 illustrates physical channels used in a 3GPP system and a general signal transmission method using the same.

When a UE is powered on or enters a new cell, the UE performs initial cell search such as establishment of synchronization with an eNB (S301). To this end, the UE may receive a primary synchronization signal (PSS) and a secondary synchronization signal (SSS) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a downlink reference signal (DL RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information (S302).

When the UE accesses an eNB for the first time or there is no radio resource for signal transmission, the UE may perform a random access procedure for the eNB (S303 to S306). To this end, the UE may transmit a specific sequence as a preamble through a physical random access channel (PRACH) (S303 and S305) and receive a response message to the preamble through the PDCCH and the PDSCH corresponding to the PDCCH (S304 and S306). In a contention-based random access procedure, a contention resolution procedure may be additionally performed.

The UE which has performed the above procedures may receive a PDCCH/PDSCH signal (S307) and transmit a PUSCH/PUCCH signal (S308) according to a general UL/DL signal transmission procedure. In particular, the UE receives downlink control information (DCI) through the PDCCH. Herein, the CCI includes control information such as resource allocation information for the UE and comes in a different format according to the purpose thereof.

Control information that the UE transmits to the eNB or receives from the eNB through uplink includes a UL/DL acknowledgement (ACK)/negative ACK (NACK) signal and channel state information (CSI) such as a channel quality indicator (CQI), a precoding matrix (PMI) and a rank indicator (RI). For the 3GPP LTE system, the UE may transmit the ACK/NACK signal and only control information (UCI) such as the CSI over a PUSCH and/or PUCCH.

Figure 4:
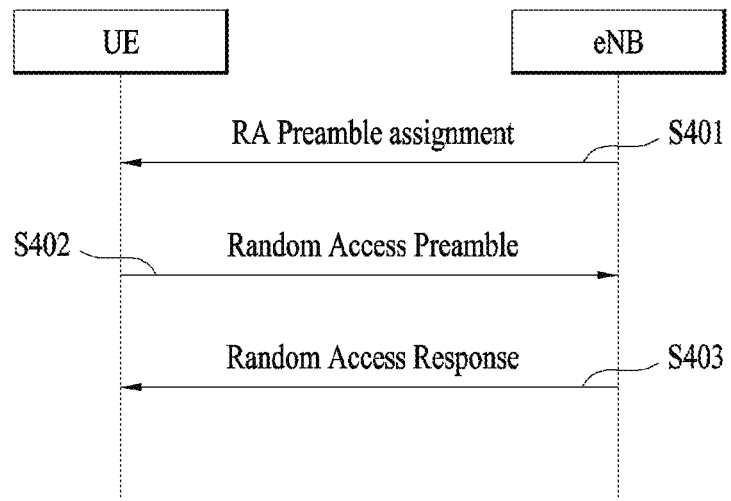
FIGS. 4 and 5 specifically illustrate a random access procedure used in the present invention.
Figure 5:
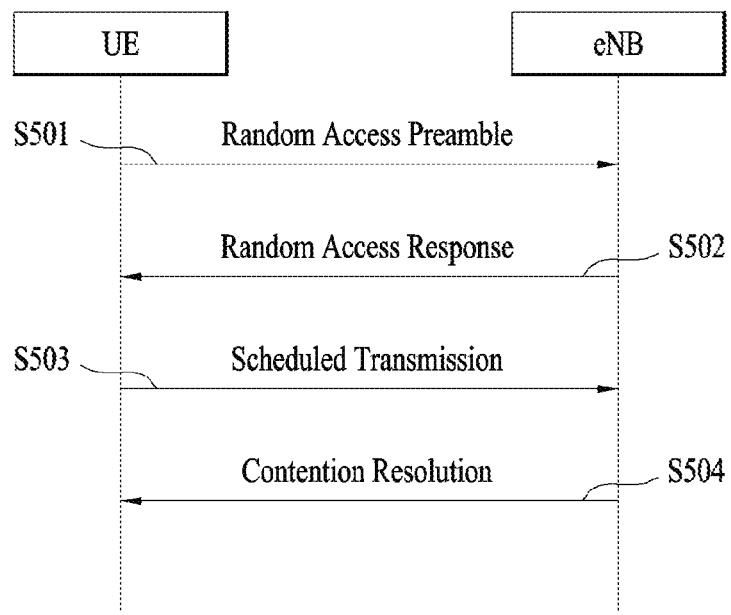

FIGS. 4 and 5 specifically illustrate a random access procedure used in the present invention.

The UE performs the random access procedure in the following cases.

The UE performs initial access since there is no radio resource control (RRC) connection to an eNB.

The UE accesses a target cell for the first time in a handover procedure.

The random access procedure is requested by a command from the eNB.

Data to be transmitted on uplink is generated while uplink time synchronization is not established, or a designated radio resource used to request a radio resource is not allocated.

A recovery procedure is performed due to radio link failure or handover (HO) failure.

In selecting a random access preamble in the LTE system, both a contention-based random access procedure, through which the UE selects one preamble to use within a specific set, and a non-contention-based random access procedure, through which a random access preamble allocated to a specific UE by the eNB is used, are provided. The non-contention-based random access procedure may be used only in the HO procedure or only when the procedure is requested according to a command from the eNB.

A random access procedure that a UE performs with a specific eNB may include (1) the UE transmitting a random access preamble to the eNB (hereafter, referred to as transmission of "a first message (message 1)" if there is no confusion), (2) receiving a random access response from the eNB in response to the transmitted random access preamble (hereafter, referred to as reception of "a second message (message 2)" if there is no confusion), (3) transmitting a UL message using the information received through the random access response message (hereafter, referred to as transmission of "a third message (message 3)" if there is no confusion) and (4) receiving a message corresponding to the UL message from the eNB (hereafter, referred to as reception of "a fourth message (message 4)" if there is no confusion).

FIG. 4 specifically illustrates operations of the UE and the eNB in the non-contention-based random access procedure.

(1) Assignment of a Random Access Preamble

As described above, the non-contention-based random access procedure may be performed (1) in the HO procedure, and (2) when the procedure is requested by a command from the eNB. Of course, the condition-based random access procedure may also be performed in both cases.

To ensure the non-contention-based random access procedure, it is important to receive a designated random access preamble which has no possibility of collision from the eNB. The random access preamble may be indicated to the UE through an HO command or a PDCCH command. Thereby, the random access preamble is assigned to the UE (S401).

(2) Transmission of Message 1

After the UE is assigned a random access preamble solely designated thereto, the UE transmits the designated random access preamble to the eNB (S402).

(3) Reception of Message 2

After transmitting the random access preamble in step S402, the UE attempts to receive a random access response directed thereto within a random access response window indicated by the eNB through system information or an HO command (S403). More specifically, the random access response information may be transmitted in the form of media access control (MAC) protocol data unit (PDU). The MAC PDU may be delivered over a PDSCH. In addition, in order to properly receive information delivered over the PDSCH, the UE monitors the PDCCH. Herein, the monitoring operation refers to an attempt to decode each PDCCH candidate within a time-frequency resource set where the PDCCH may be present according to all monitored DCI formats. The time-frequency resource set in which the UE may discover a PDCCH thereof in a subframe is referred to as a search space. Individual resources on which the PDCCH may be transmitted in the search space are referred to as PDCCH candidates. A set of PDCCH candidates for the UE to monitor is defined as the search space. The PDCCH carries information about a UE to receive the PDCCH, information about the frequency and time of a radio resource of the PDSCH, and DCI such as the transmission format of the PDSCH. Once the UE succeeds in receiving the PDCCH transmitted thereto, the UE may properly receive a random access response transmitted over the PDSCH according to the information on the PDCCH. The random access response may include a random access preamble ID (e.g., a random access radio network temporary identifier (RA-RNTI)), a UL grant indicating a UL resource, a cell radio network temporary identifier (C-RNTI) and a timing advance command (TAC).

The random access preamble ID is needed for a random access response since one random access response contains random access response information for one or more UEs. That is, it is necessary to announce a UE for which the UL grant, the temporary C-RNTI and the TAC are valid. In this step, it is assumed that the UE selects a random access preamble ID coinciding with a random access preamble the UE has selected in step S402.

In the non-contention-based random access procedure, when the UE receives random access response information, the UE may terminate the random access procedure, determining that the random access procedure has been normally performed.

FIG. 5 is a diagram illustrating operations of the UE and the eNB performed in the condition-based random access procedure.

(1) Transmission of Message 1

A UE may randomly select a random access preamble from a set of random access preambles indicated through system information or an HO command, and select and transmit a physical RACH (PRACH) resource on which the random access preamble may be transmitted (S501).

(2) Reception of Message 2

Random access response information is received using a method similar to the method used in the non-contention-based random access procedure. That is, after transmitting the random access preamble as performed in step S401, the UE attempts to receive a random access response thereof within a random access response reception window indicated through the system information or an HO command by an eNB, and receives corresponding RA-RNTI information (S402). Thereby, the UE may receive a UL grant, a temporary C-RNTI and a TAC.

(3) Transmission of Message 3

If the UE receives a valid random access response, the UE processes the information included in the random access response. That is, the UE applies the TAC and stores the temporary C-RNTI. In addition, the UE transmits data (i.e., message 3) to the eNB using the UL grant (S403). Message 3 should include an ID of the UE. This is because the eNB cannot determine which UEs perform the random access procedure in the contention-based random access procedure and the UEs need to be identified for future contention resolution.

Two methods to include the ID of the UE in message 3 have been discussed. According to a first method, if the UE has a valid cell ID assigned thereto in a corresponding cell before the random access procedure, the UE transmits the cell ID thereof via a UL transmission signal corresponding to the UL grant. On the other hand, if the UE has not been assigned a valid cell ID before the random access procedure, the UE transmits its unique ID (e.g., System Architecture Evolution (SAE)-Temporary Mobile Subscriber Identity (S-TMSI) or a random ID) in the message. In general, the unique ID is longer than the cell ID. Once the UE has transmitted data corresponding to the UL grant, the UE starts a contention resolution timer.

(4) Reception of Message 4

After transmitting the data including the ID of the UE through the UL grant included in the random access response, the UE awaits instruction from the eNB for contention resolution. That is, the UE attempts to receive a PDCCH in order to receive a specific message (S404). Two methods for receiving the PDCCH have been discussed. As described above, if message 3 is transmitted according to the UL grant using the ID of the UE or the cell ID, the UE may attempt to receive a PDCCH using the cell ID thereof. If the ID is a unique ID, the UE may attempt to receive a PDCCH using the temporary C-RNTI included in the random access response. In the former case, if the UE receives the PDCCH using the cell ID thereof before the contention resolution timer expires, the UE terminates the random access procedure, determining that the random access procedure has been normally performed. In the latter case, if the UE receives a PDCCH using the temporary C-RNTI before the contention resolution timer expires, the UE checks the data delivered through the PDSCH indicated by the PDCCH. If the data contains the unique ID of the UE, the UE terminates the random access procedure, determining that the random access procedure has been normally performed.

Resources for D2D communication may be assigned by an eNB. To this end, a transmission (Tx) UE performing D2D communication may make a request to the eNB for a radio resource, and the eNB may assign a resource in response. Thereby, the Tx UE may transmit signals to one or more reception (Rx) UEs through the assigned resource. In the following description, a method for a Tx UE to randomly access an eNB in a manner different from the aforementioned typical D2D communication or in a manner similar to the random access procedure to initiate D2D communication is proposed.

In one embodiment of the present invention, it is proposed that direct communication between UEs be implemented in a manner of broadcast, groupcast or group communication service by changing messages 1 to 4 of the legacy random access procedure as described below. Hereinafter, for simplicity of description, message 1, message 2, message 3 and message 4 are expressed as msg1, msg2, msg3 and msg4, respectively.

As used in the following description, msg1, msg2, msg3, and msg4 represent information or signals in the steps described below. The following steps are procedures which are generally applied to several proposed methods, and may not be exactly the same as procedures applied to a specific method. For simplicity, the steps are classified as follows.

Msg1 (Step 1):

Step 1 may be defined as a signal announcing that broadcast/groupcast signal transmission (to be implemented in step 3) will be attempted according to a rule that is subsequently determined. Herein, the aforementioned signal may be referred to as msg1 for simplicity. The signal may be delivered from a D2D UE to a specific eNB. According to a method, other D2D UEs may receive or overhear msg1.

Msg2 (Step 2):

Step 2 is a response of the eNB to Step 1. Step 2 delivers information (e.g., resource assignment, power control, timing lapse, cyclic prefix (CP) length, and the like) which is needed for the D2D UE having requested Step 1 to transmit a broadcast/groupcast signal corresponding to msg3. Herein, the signal may be referred to as msg2.

Msg3 (Step 3):

Step 3 is a procedure in which the D2D broadcast/groupcast Tx UE having requested Step 1 delivers a broadcast/groupcast signal to a D2D Rx UE. In some cases, the signal may be delivered only to a restricted D2D Rx UE or UE group. That is, the subject to receive the broadcast/groupcast signal may be limited. Further, in some cases, an eNB may be allowed to receive the signal and perform a proper operation (e.g., relay or repetitive transmission) in response. Herein, the signal may be referred to as msg3.

Msg4 (Step 4):

Step 4 represents an operation of assisting normal implementation of Step 3. Step 3 causes an operation to be performed according to whether signal reception is successful or according to a channel over which a signal is incorrectly received and a cause of incorrect signal reception. In some cases, the eNB may broadcast/groupcast, to D2D Rx UEs or an Rx UE group, a message (msg3) transmitted in Step 3, at a transmission time of Step 4. Herein, the aforementioned signal may be referred to as msg4.

The procedure described above may appear to be similar to the random access procedure. However, the overall operation and functions of the procedure described using the term random access procedure or the details of the random access procedure may be different from those of the random access procedure. Unless stated otherwise, the procedure will re-employ the random access procedure and functions.

Hereafter, description will be given of exemplary application of D2D communication using the aforementioned procedures or messages, with reference to the drawings.

Figure 6:
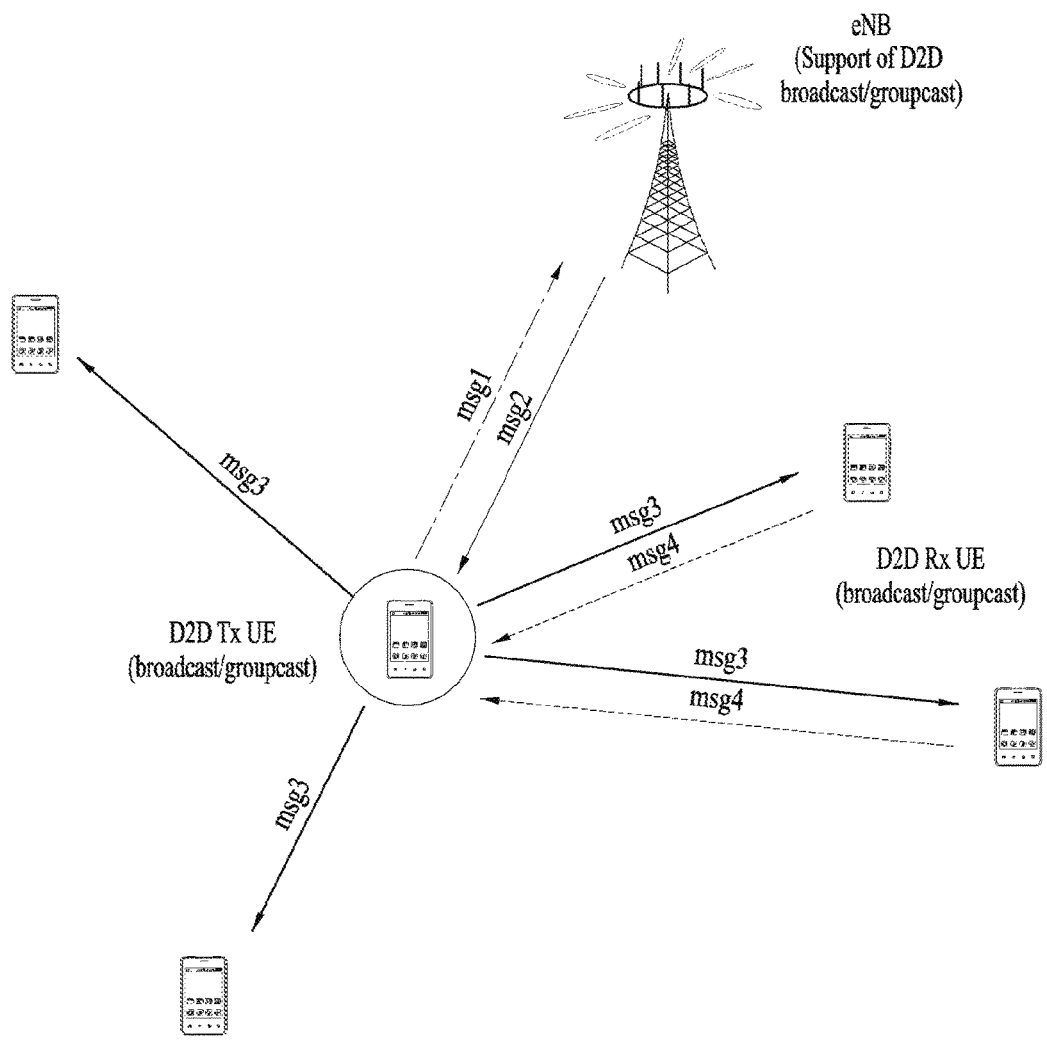
FIGS. 6 and 7 illustrate D2D communication performed through a pseudo-random access procedure according to an embodiment of the present invention.
Figure 7:
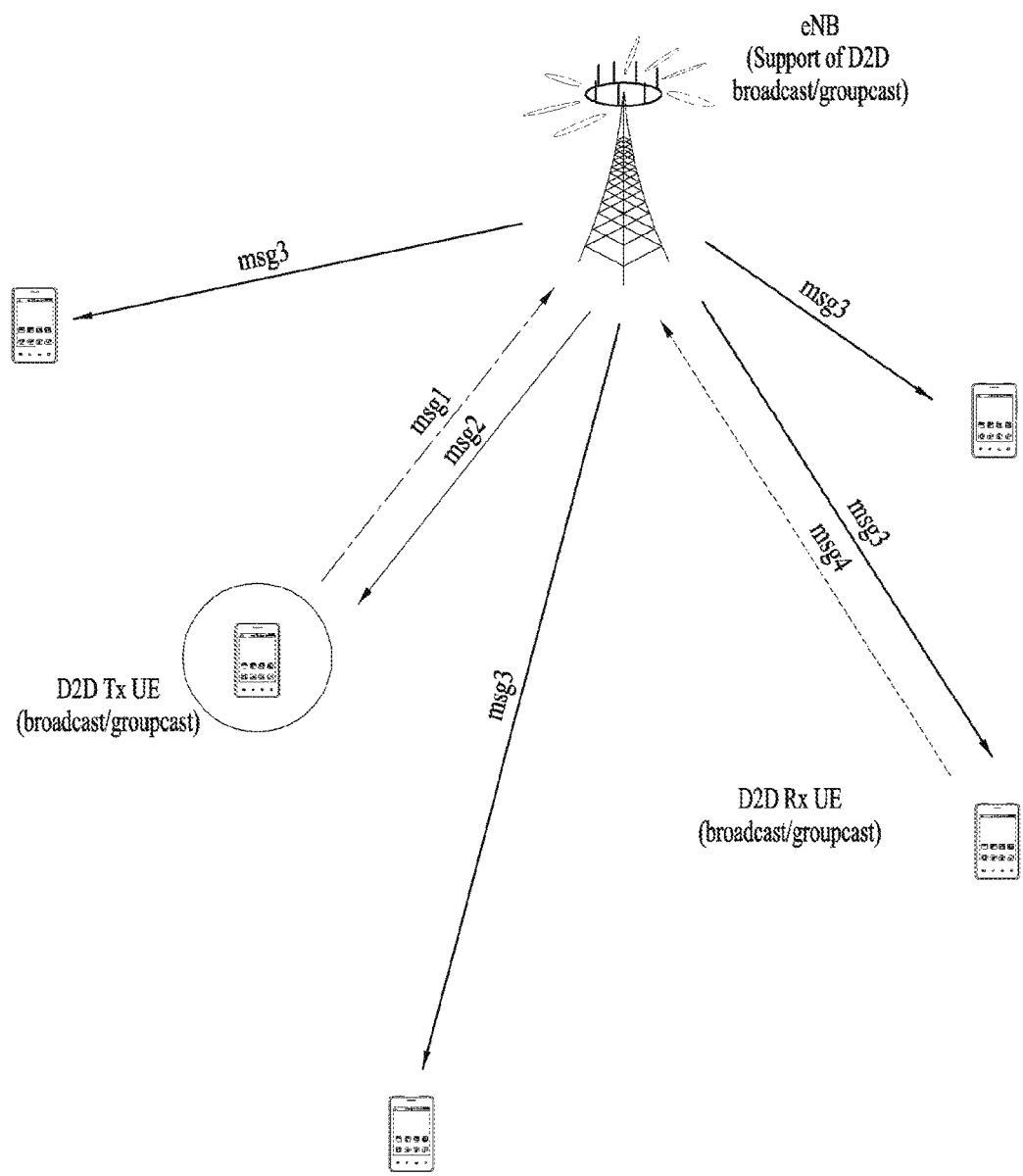

FIGS. 6 and 7 illustrate D2D communication performed through a pseudo-random access procedure according to an embodiment of the present invention.

In FIGS. 6 and 7, a Tx UE may transmit, to an eNB, msg1 thereof similar to a random access preamble in a preconfigured resource interval to initiate D2D communication. The eNB receiving msg1 of the Tx UE may be a serving eNB providing a service to the Tx UE, and may support D2D communication broadcast/groupcast of the Tx UE.

In FIGS. 6 and 7, the eNB may transmit msg2 containing information about, for example, resource assignment for transmission of msg3 of the Tx UE to the Tx UE in response to msg1.

In the example illustrated in FIG. 6, the Tx UE receives msg2 and transmits msg3 to Rx UEs of a predetermined group. That is, in the example of FIG. 6, the Tx UE may directly deliver msg3 to Rx UEs using resources assigned through msg2, without intervention of the eNB. When necessary, the Rx UEs receiving msg3 may deliver msg4 to the Tx UE to signal whether or not reception of msg3 is successful.

Contrary to FIG. 6, FIG. 7 illustrates an exemplary case where a serving eNB in place of the TX UE transmits msg3 to a predetermined Rx UE group. When necessary, the Rx UEs receiving msg3 may deliver msg4 to the eNB to signal whether or not reception of msg3 is successful.

Figure 8:
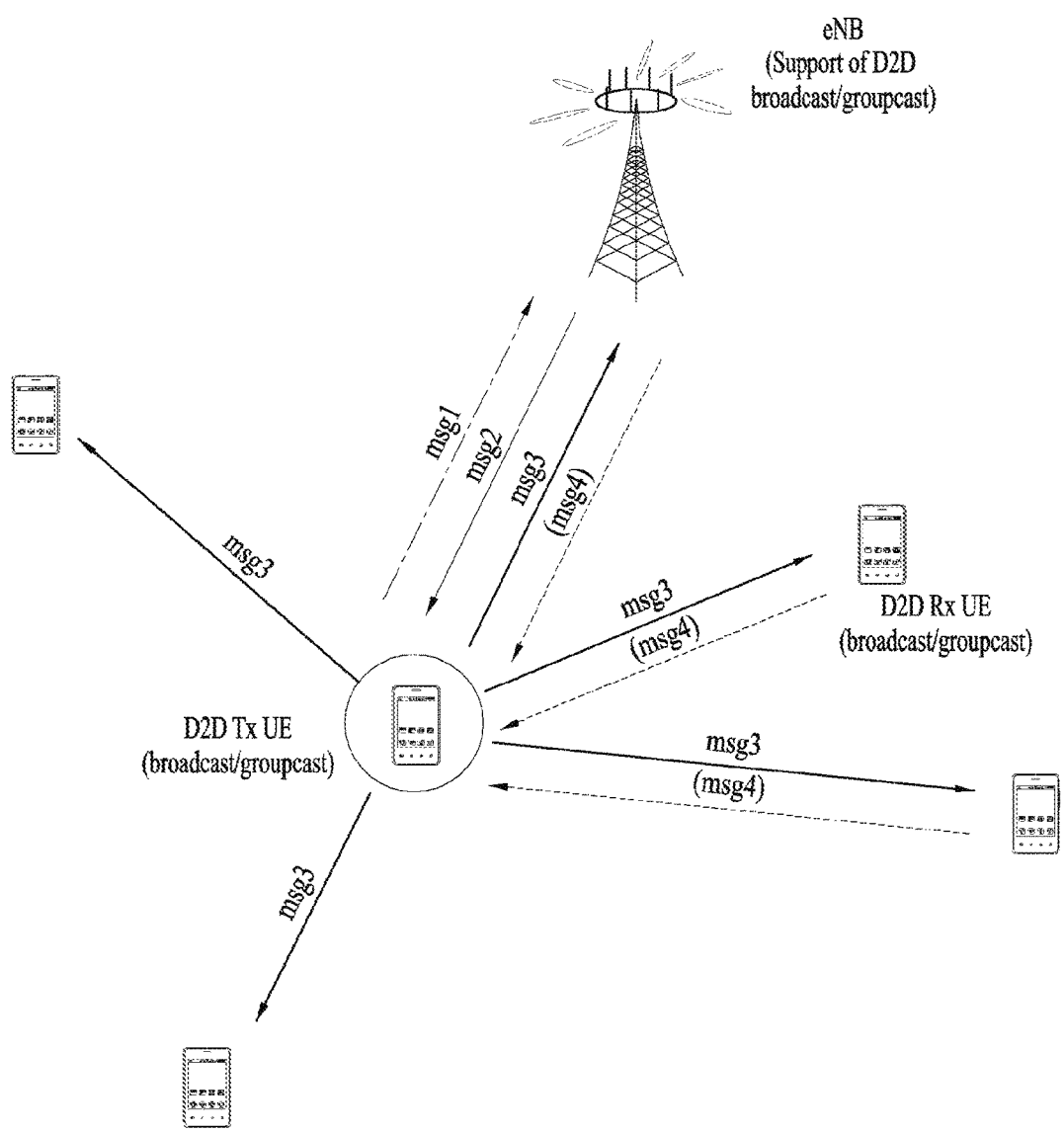
FIG. 8 illustrates D2D communication performed through a pseudo-random access procedure according to another embodiment of the present invention.

FIG. 8 illustrates D2D communication performed through a pseudo-random access procedure according to another embodiment of the present invention.

Similar to FIG. 6, FIG. 8 illustrates an example of direct transmission of a broadcast/groupcast signal from a Tx UE. In the example of FIG. 8, the serving eNB also receives msg3 transmitted by the Tx UE, and transmits msg4 as necessary. As the eNB receives msg3, not only the Tx UE but also the eNB may become subjects to perform retransmission according to a HARQ retransmission request, as will be described later.

Hereinafter, a detailed description will be given of configurations of msg1 to msg4 in D2D communication employing the pseudo-random access procedure.

Msg1

According to embodiments of the present invention, it is proposed that a Tx UE randomly select a signature from among predetermined signatures received through system information as in the case of the random access preamble of LTE and transmit msg1 through a resource randomly selected from among predetermined time-frequency resources.

The system information for msg1 for D2D communication may have a form similar to PRACH of LTE as shown below. For simplicity, this information will be referred to as D2D-PRACH configuration information, but it may also be assigned other names.

TABLE 1

D2D-PRACH-Config information elements

| D2D-PRACH-ConfigSIB ::= | SEQUENCE { |
|---|---|
| rootSequenceIndex | INTEGER (0..A), |
| D2d-prach-ConfigInfo | d2d-PRACH-ConfigInfo |
| } | |
| d2d-PRACH-Config ::= | SEQUENCE { |
| rootSequenceIndex | INTEGER (0..A), |
| d2d-prach-ConfigInfo | d2d-PRACH-ConfigInfo |
| | OPTIONAL -- Need ON |
| } | |
| D2d-PRACH-ConfigSCell-r10 ::= | SEQUENCE { |

TABLE 1-continued

D2D-PRACH-Config information elements

| D2d-prach-ConfigIndex-r10 | INTEGER (0..B) |
|---|---|
| } | |
| D2d-PRACH-ConfigInfo ::= | SEQUENCE { |
| D2d-prach-ConfigIndex | INTEGER (0..B), |
| highSpeedFlag | BOOLEAN, |
| zeroCorrelationZoneConfig | INTEGER (0..C), |
| D2d-prach-FreqOffset | INTEGER (0..D) |
| } | |
| -- ASN1STOP | |

In the system information above, the value A of rootSequenceIndex, the value B of physical configuration, the value C of zeroCorrelationZone, and the frequency offset value D may be set to any values as necessary. In addition, this embodiment is simply illustrative, and it is possible to omit a part of the system information.

Msg2—(Function of Msg2 as a Scheduling Command)

Two cases are described below on the assumption that a command for normal scheduling may be different from a scheduling command for (emergency) broadcast. Even if the same scheduling format is given, each field may have a different meaning or be differently interpreted according to the purpose thereof. Decoding may be attempted first and then an indicator field (e.g., a 1-bit field) for distinguishing between (emergency) broadcast and normal scheduling may be provided in the corresponding field.

A. Content of a msg2 scheduling command for broadcast/groupcast (Very simplified) resource allocation information (Very simplified or truncated) modulation and coding scheme (MCS)

Hopping flag

Priority indicator (for an emergency situation)

Power control command (or fixed/maximum power value (configurable value) as will described later)

Timing lapse or partial time lapse information

In-band emission information, when necessary

UE ID-based processing

Groupcast HARQ information

Priority counting information (fairness information)

Other field(s)

B. Content of a msg2 scheduling command for normal scheduling (Very simplified) resource allocation information (Very simplified or truncated) MCS Hopping flag Priority indicator (for an emergency situation)

Power control command (or fixed/maximum power value (configurable value) as will described later)

Timing lapse or partial time lapse information

In-band emission information, when necessary

UE ID-based processing

Groupcast HARQ information

Priority counting information (fairness information)

Other field(s)

If a random access response (RAR)-based RACH scheduling command of the legacy RACH procedure is used, the following fields may be formed to serve other purposes.

20-Bit UL Grant (Random Access Response Grant)

Hopping flag—1 bit

Allocation of a resource block having a fixed size—10 bits

Truncated MCS—4 bits
Transmit power control (TPC) command for PUSCH transmission—3 bits
UL delay—1 bit
CSI request—1 bit The 1-bit CSI request is intended for D2D broadcast and is substantially unlikely to be used. Accordingly, the CSI request may be set to a specific bit and a coding gain may be obtained using the bit as a virtual coding bit. Alternatively, the CSI request may be used as an indicator for distinguishing between (emergency) broadcast and groupcast as described above. For example, the bit may be configured as follows.

Bit state "A": (Emergency) broadcast/groupcast scheduling grant
Bit state "B": Normal scheduling grant
Msg3 and Msg4

As described in the aforementioned operation, msg3 and msg4 may substantially correspond to a message that the Tx UE intends to deliver through broadcast and a corresponding acknowledgment, respectively.

In the case of LTE RACH, a UE having performed initial transmission of msg1 is designed to monitor msg2 and transmit corresponding msg3. According to the method of this embodiment, msg3 is intended to be broadcast to Rx UEs, and therefore the Rx UEs will not receive msg1, nor will the Rx UEs attempt to monitor msg2. Furthermore, the Rx UEs may not know the fact that the Tx UE has sent msg3, nor attempt to monitor and receive msg3. In particular, the Rx UEs should receive msg3, which is usually transmitted by a UE.

Accordingly, in order to receive msg3, a special action is to be taken in advance. In particular, information for decoding and demodulating msg3 is necessary. For this reason, it is preferable for the Rx UEs to receive msg2, which serves to approve scheduling of msg3. That is, it is preferable to deliver, to the Rx UEs, information capable of executing decoding and demodulation of msg3 (resource allocation, MCS, HARQ, transmission time, timing lapse, CP length, emergency indicator, hopping indicator, priority indicator, number of msg3 transmissions, retransmission timing, a HARQ response method, etc.) through msg2. In addition, before the msg2 and information for decoding and demodulation are delivered, the Rx UEs need to receive msg2. Accordingly, it is preferable to pre-signal information about a time at which msg2 is transmitted or is likely to be transmitted, RNTI-related information (e.g., RA-RNTI for demasking PDCCH for msg2 if the PDCCH is masked with an RNTI, a range of RNTI values reserved for a D2D Tx UE or a certain allocated value), a Tx UE ID (when necessary), and information about msg1 of the Tx UE (e.g., a time-frequency resource index, a subframe, a radio frame, a UE ID, an IMSI), particularly, information used in scrambling and masking msg2.

Alternatively, information (a fixed or determined value) about a subframe in which MSG2 is transmitted may be pre-signaled to the Rx UEs in a broadcast manner, and a subframe or a radio frame configured in this way may need to be persistently monitored to decode and demodulate msg3.

When msg3 is delivered via a relay, the delivered msg3 is likely to take the form of msg4. Accordingly, the Rx UE persistently performs monitoring at the msg4 delivery time to decode and demodulate msg4 (having a format including msg3 information or including a case where msg3 itself is transmitted) so as to finally obtain a broadcast message.

Alternatively, if msg4 is transmitted in the same format as msg3, this transmission may be considered as retransmission or repetitive transmission of msg3 rather than transmission of msg4.

Next, if msg2 is received, it is assumed that msg3 has been normally transmitted. Msg3 may be delivered from a Tx UE to an eNB and Rx UEs. Once the eNB receives msg3, the eNB may deliver msg4 to the Tx UE to signal whether or not reception is successful. Similarly, in the case of groupcast, Rx UEs receiving msg3 may transmit msg4 (wherein msg4 is a message delivered to the Tx UE by the Rx UEs and may be identical to or different from a message which is delivered to the Tx UE by the eNB) to signal whether or not reception is successful. In the case of broadcast, the Rx UEs may not perform msg4 transmission. Alternatively, the Rx UEs may deliver, to the eNB, information indicating whether or not reception of msg4 is successful, and the eNB may collect the information and deliver the same to the Tx UE. In this method, it is assumed that the eNB is capable of receiving signals from all Rx UEs relatively well. In this case, the eNB may become a device to finally determine whether or not msg3 is received. If msg3 is not properly delivered, the eNB may re-schedule msg2 such that msg3 transmission is attempted.

As another issue, if there is no response to transmitted msg3, this case is analyzed. No response is provided, namely the Tx UE does not receive msg4 for two major reasons: one reason may be that msg4 sent by the eNB is not capable of decoding the PDCCH, and the other one may be that the PDSCH is not decoded or demodulated.

(1) Error in PDCCH (PDCCH Detection Failure)

Although a PDCCH for msg4 is monitored, the PDCCH (hereinafter, referred to as msg4 PDCCH) may not be detected. This is the case where a msg3 fails to be received. Failure of reception of msg3 may occur in two cases. In one case, msg3 may not be properly received when msg3 collision occurs (e.g., when one or more Tx UEs transmit MSG 1, receive a msg2 response simultaneously, and then transmit msg3 respectively). In the other case, msg3 is not properly received as the radio channel for msg3 transmission is not good. A simple method to address this issue is to restart the failed D2D broadcast transmission procedure with msg1. Of course, in this procedure, previously received parameters and corresponding values may be reused.

Alternatively, values of the parameters may be increased to a certain degree. For example, transmit power of msg1 may be increased from the existing value. Alternatively, when transmission of msg1 is successful, scheduling may be attempted by setting a TPC command value for a msg2 scheduling grant to a higher value.

Alternatively, if there is no response to msg4, msg1 may be skipped and a msg3 scheduling grant may be received again by monitoring msg2 in agreed subframe(s) (subframe(s) agreed to be recognized in this situation) in which msg2 is transmitted.

It is also possible to eliminate msg4 and simply broadcast msg3. Msg4 is designed to be used for HARQ operation for msg3 and RRC connection completion or confirmation. However, if broadcasting is performed in D2D communication, a response may not be necessary, and thus msg4 may not be necessary. In particular, operations may be normally performed outside network coverage without msg4.

(2) Error in PDSCH (PDSCH Demodulation Failure)

If detection of msg4 PDCCH is successful, this means that msg3 has been normally received in the previous process. Accordingly, msg4 PDCCH may have been transmitted. However, there may be an error in the PDSCH and thus it may not be possible to demodulate the PDSCH. This case corresponds to an error situation in the HARQ operation. The normal HARQ operation would transmit negative acknowledgment (NACK). However, in D2D broadcast, it may not be necessary to retransmit msg3 in contrast with the case of the legacy RACH. If retransmission is needed, the retransmission may be performed by transmitting, via msg2, a scheduling grant for the retransmission, or a Tx UE may perform the retransmission using pre-designated scheduling grant information.

When two or more Tx UEs transmit msg3, msg3 transmitted by one of the Tx UEs may be detected and successfully demodulated by the eNB. In this case, msg4 response may be delivered to the Tx UE having successfully transmitted msg3. Then, the eNB having successfully received msg3 may respond to the Tx UE using msg4 for announcing whether or not reception of the broadcast message is successful. Then, the Tx UE terminates the broadcast transmission procedure. However, a Tx UE receiving msg4 response which is not directed thereto, the Tx UE preferably returns to the msg1 transmission operation. Since even the eNB does not know which Tx UE has transmitted a broadcast, a msg2 scheduling grant for msg3 cannot be generated. This contention resolution procedure is performed using RACH msg4. In this case, if a Tx UE receiving msg4 determines that msg4 does not have the UE ID of the Tx UE, transmission of msg1 is performed.

A D2D Rx UE may not only receive a D2D broadcast but also maintain connection with the eNB. Accordingly, the D2D Rx UE may receive scheduling of PDSCH from the eNB over the PDCCH/EPDCCH. In this case, the Rx UE needs to determine whether to receive D2D broadcast msg3 (which is or is not relayed) and whether to receive a normal PDSCH from the eNB.

If possible, the Rx UE may receive and process both D2D broadcast msg3 and the normal PDSCH. However, if the Rx UE determines that it is preferable to receive one of D2D broadcast msg3 and the normal PDSCH (particularly, in the same carrier, the same band or the same spectrum), it is better to receive relayed D2D broadcast msg3. Considering that a broadcast message is an unusual signal, a reception priority is preferably assigned to the D2D link.

However, in a situation wherein carrier 1 maintains eNB-UE communication connection and carrier 2 maintains D2D communication connection when multiple carriers are provided, if D2D broadcast msg3 relayed through carrier 2 is transmitted, it is preferable to receive D2D broadcast msg3 along with a PDSCH scheduled using carrier 1 at the same time.

For reference, the legacy RACH operation is described below.

In the LTE RACH operation, if a UE is assigned an RA-RNTI and a C-RNTI or semi-persistent scheduling (SPS)C-RNTI (SPS-C-RNTI or SPC-RNTI) in the same subframe, and is not configured by a plurality of timing lapse groups, the UE need not decode a PDSCH indicated by a PDCCH having cyclic redundancy check (CRC) scrambled with the C-RNTI or SPS-RNTI.

TABLE 2

| DCI format | Search Space | Transmission scheme of PDSCH corresponding to PDCCH |
|---|---|---|
| DCI format 1C | Common | If the number of PBCH antenna ports is one, Single-antenna port, port 0 is used (see 3GPP TS 36.211 Rel-8/Rel-9 subclause 7.1.1), |

TABLE 2-continued

| DCI format | Search Space | Transmission scheme of PDSCH corresponding to PDCCH |
|---|---|---|
|  |  | otherwise Transmit diversity (see 3GPP TS 36.211 Rel-8/Rel-9 subclause 7.1.2) |
| DCI format 1A | Common | If the number of PBCH antenna ports is one, Single-antenna port, port 0 is used (see 3GPP TS 36.211 Rel-8/Rel-9 subclause 7.1.1), otherwise Transmit diversity (see 3GPP TS 36.211 Rel-8/Rel-9 subclause 7.1.2) |

Herein, when it is assumed that the RA-RNTI is used for D2D broadcast in contrast with conventional cases, only the RA-RNTI needs to be decoded even if a C-RNTI and an SPS C-RNTI are detected along with the RA-RNTI. Accordingly, the UE may not expect the C-RNTI and the SPS C-RNTI to be received, and operate on the assumption that neither the C-RNTI nor the SPS C-RNTI is transmitted.

If broadcast and groupcast are performed by introducing a new RNTI such as a D2D RNTI to the D2D broadcast in place of the RA-RNTI, it may be compulsorily assumed that there is no PDSCH scheduled with the C-RNTI and the SPS C-RNTI other than the D2D RNTI.

Since relayed msg3 is not restricted to a specific decoding time, the relayed msg3 may be stored when received and then decoded when decoding is allowed. The D2D RNTI may be received upon receiving the C-RNTI and the SPS C-RNTI. Then, the C-RNTI, the SPS C-RNTI and the D2D RNTI may be sequentially decoded according to levels of emergency or priorities thereof.

Although msg4 has been discussed above, the D2D link should be prioritized in view of a D2D Tx UE receiving msg2 (e.g., a grant for broadcast msg3 scheduling) in performing the D2D operation. Accordingly, a link for delivering D2D msg2 such as a D2D RA-RNTI or a new D2D RNTI should be preferentially received. That is, an operation may be performed such that presence of a PDSCH scheduled with the C-RNTI or the SPS C-RNTI is not expected in the same subframe.

While D2D broadcast has been mainly discussed above, the proposed techniques may be applied not only to groupcast but also to unicast.

Introduction of D2D communication has been considered to ensure public safety. Accordingly, D2D communication should be allowed not only in a network coverage for intra-cell communication, which refers to communication between UEs within the coverage of an eNB, and inter-cell communication, which refers to communication between UEs positioned within coverages of different eNBs, but also in a partial network coverage which may be indirectly controlled by an eNB through other UEs positioned outside the cell or on the cell boundary. In addition, it is better to allow D2D communication to be performed in a situation which is out of control of the eNB, namely outside the network coverage. As one method to implement D2D communication outside the network coverage, it may be assumed that a UE cluster is explicitly or implicitly created, and contains a head which performs semi-centralized scheduling or full-centralized scheduling like an eNB or implement a part of the function of the eNB in place of the eNB. For example, the cluster head may perform very simple coordination. Hereinafter, D2D communication between UEs outside network coverage will be described with reference to FIGS. 9 to 13, and D2D communication performed by a UE of the partial network coverage will be described with reference to FIGS. 14 to 16. For reference, the UE may be capable of recognizing whether or not the UE is outside the network thereof using various methods such as cell scanning and cell selection. For example, the UE may determine whether the UE is inside, outside or on the boundary of a cell or network by attempting to detect or detecting a synchronization signal or a synchronization channel. Accordingly, the embodiments described above and below assume that the UE is capable of recognizing whether the UE is inside, outside or on the boundary of the network, and are applicable regardless of the method which the UE uses to recognize the location thereof. In addition, since the UE cluster is explicitly or implicitly created, the embodiments described above and below assume that the UE is capable of recognizing a cluster to which the UE belongs.

Outside Network Coverage

Figure 9:
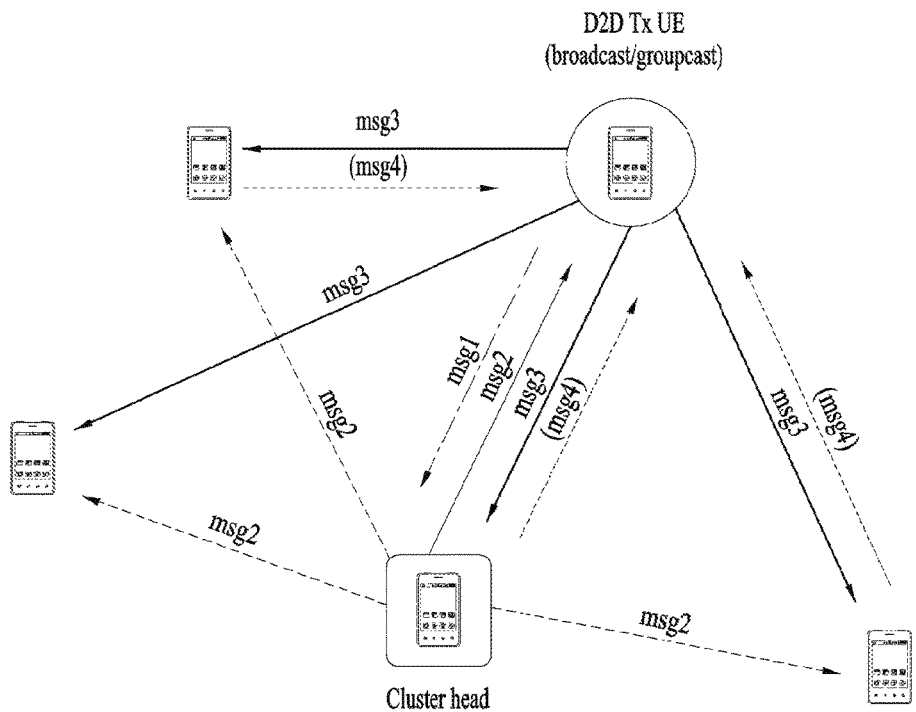
FIG. 9 illustrates D2D broadcast/groupcast performed outside coverage.

FIG. 9 illustrates D2D broadcast/groupcast performed outside coverage.

Referring to FIG. 9, a UE having a message to broadcast is referred to as a D2D broadcast/groupcast Tx UE, in short, a Tx UE, and a UE receiving the broadcast message is referred to as a D2D broadcast/groupcast Rx UE, in short, a Rx UE. The Tx UE transmits msg1, which serves to request broadcast scheduling, to a cluster head, which is partially in charge of resource management/coordination, in order to be assigned a resource consisting of one of time, frequency, sequence (code) and a combination thereof for delivery of the broadcast message. The form of Msg1 may be the same as or similar to that of an RACH preamble.

Figure 10:
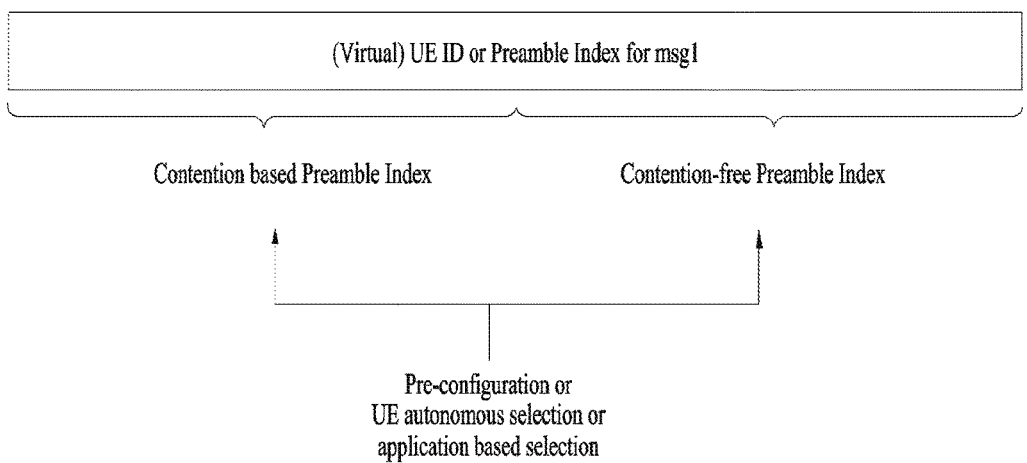
FIG. 10 illustrates classification of resources used for a message (e.g., msg1) for requesting resource allocation for transmission of a D2D signal.

FIG. 10 illustrates classification of resources used for a message (e.g., msg1) for requesting resource allocation for transmission of a D2D signal.

When P preamble sequences are given, some of the preamble sequences may be used for contention-based preamble transmission and the other preamble sequences may be used for non-contention-based preamble transmission. For contention-based transmission, a preamble (sequence index) resource for transmission is randomly selected from a predetermined preamble (sequence index) set. On the other end, for non-contention-based transmission, a preamble (sequence index) resource may be pre-designated/pre-assigned, or may need to be designed such that the resource is recognized explicitly or implicitly by a UE according to a transmission resource region (e.g. t_id, f_id), a UE ID, a UE group (ID), a UE priority index, and the like. For example, when msg1 is transmitted through a specific resource region, a preamble (sequence) index may be determined according to the position of the resource region. The UE may be allowed to select and apply either non-contention-based transmission or condition-based transmission without constraint. Alternatively, either non-contention-based transmission or condition-based transmission may be automatically preconfigured according to the UE application. For example, when the UE makes an emergency call, the UE may be preconfigured or fixed to attempt transmission using a contention-free source. Alternatively, a resource for transmission may be differently assigned depending on the cluster group in order to minimize collision.

Transmission of msg1 may be performed using a pre-designated time and resource (as in the case of LTE RACH access slot pre-configuration, namely PRACH reconfiguration), or may be performed using a time and resource determined based on a unique attribute (e.g., ID) of the UE. Alternatively, transmission may be performed based on information broadcast by the cluster head with a periodicity. For example, if an Rx UE detects a specific cluster head and desires to operate in a group to which the cluster head belongs, the UE identifies a resource for a Tx UE to use to perform broadcast by monitoring the broadcast information of the cluster head. The cluster head may transmit D2D access configuration information for msg1 through a beacon, a synchronization channel, or a broadcast channel. This operation may be similar to a preliminary procedure through which the PRACH configuration should be received before transmission of the PRACH preamble. Meanwhile, configuration information containing timing information about msg1, msg2, msg3 and msg4 may be pre-provided to all D2D UEs. This method may be implemented through operation and management (OAM) or a broadcast signal.

Upon receiving msg1, the cluster head determines or schedules a time for the Tx UE to broadcast msg3, and then delivers the time information to the Tx UE using msg2. This information may be recognized through broadcast slot configuration information that is broadcast. Meanwhile, Rx UEs which desire to or must overhear msg3 should be allowed to overhear msg2. The time at which msg2 is transmitted needs to be pre-announced such that all UEs within the D2D broadcast the range can overhear msg2 or all Rx UEs within the broadcast ranging can receive msg2. That is, if the UEs know that msg1 has been transmitted by the Tx UE, the UEs may be allowed to recognize the msg2 transmission time. For example, msg2 transmission may be designed to be performed in the N_msg1-th subframe after msg1 is transmitted. Alternatively, a msg2 transmission time candidate may be determined, and the Rx UE may be caused to monitor msg2 at the determined time (e.g., subframes) and to decode a specific PDCCH upon detecting the PDCCH. For example, subframe #0 of every radio frame, every even-numbered radio frame or every odd-numbered radio frame may be pre-signaled through D2D configuration information as a msg2 transmission time candidate. The msg2 transmission time (e.g., subframe(s) having a specific subframe or subframe set or periodicity) may be pre-fixed or pre-set to a specific value. Alternatively, the msg2 transmission time may be changed through the OAM procedure. Alternatively, if the UE(s) are within the eNB coverage, the transmission time may be modified in a manner that configuration information is downloaded onto and stored in the UEs or determined by exchanging a negotiation signal with the cluster head or between UEs in a group in a distribution manner. Alternatively, the transmission time may be determined when the synchronization signal of the cluster head is received. In this case, D2D configuration information may be obtained in association with the properties (e.g., type, index, etc.) of the synchronization signal or through message information delivered together with or after the synchronization signal. The synchronization signal used for D2D communication may be a synchronization signal or a synchronization channel that is defined separately from the legacy PSS/SSS. The D2D UEs may receive a synchronization signal/channel from the cluster head or another UE and establish synchronization with other UEs participating in D2D communication.

Msg2 contains scheduling information which is necessary for msg3 broadcast. Examples of the scheduling information include a temporary ID, power control information, timing information, and cyclic prefix (CP) information. The Tx UE and Rx UEs which receive msg2 may recognize the time or resource (e.g., a transmission subframe) to transmit msg3 and the time or resource (a monitoring subframe or reception subframe) to overhear msg3.

One msg2 may be used to schedule multiple subsequent msg3 messages. It is proposed that msg2 be implemented in a manner that multiple msg3 scheduling grants are transmitted all at once as in the case of random access response (RAR) message configuration. According to this method, a scheduling command is not transmitted every time scheduling for msg3 transmission to be applied later is needed. Rather, scheduling commands for multiple msg3 messages are received simultaneously by transmitting msg2 only once.

The Tx UE transmits msg3 using a designated parameter (time, frequency, power, etc.). Msg3 may be generated using a pre-designated D2D (broadcast) temporary ID. For example, msg3 may be scrambled using the temporary C-R NTI of the LTE system and/or the international mobile subscriber identity (IMIS). Msg3 may contain a UE ID in order to resolve collision with another broadcast Tx UE. The UE ID may be separately created for D2D communication.

<Long Sequence for Reducing Collision Probability>

One method to resolve collision may be to use more kinds of sequences than the legacy RACH preamble to reduce collision possibility. As a long sequence, CAZAC sequence series, a UE ID-embedded CAZAC sequence or a Zadoff-chu sequence may be used. Although a problem such as ID redundancy may occur, a processing procedure such as hashing, which means mapping multiple UE IDs onto one new ID, may be applied to UE IDs to obtain a virtual ID or hashing ID which is shorter in length than the long sequence. Alternatively, contention resolution may be implemented using a CAZAC or Zadoff-chu sequence generated based on the obtained ID. When the length of the sequence increases, complexity of the receiver also increases. However, if a UE ID of a longer sequence is introduced to the preamble and transmitted, the number of preamble sequences increases, and therefore the probability of collision with msg1 which occurs due to random selection of the same sequence index in the msg1 step is greatly reduced. Accordingly, latency resulting from contention resolution performed in the msg4 step may be greatly reduced. In operating broadcast signals based contention, reduction of latency is particularly required for an emergency broadcast signal.

In a normal situation, the legacy RACH procedure may be utilized as much as possible. That is, for emergency broadcast, a separate preamble sequence may be used. Alternatively, a preamble sequence for emergency may be reserved. However, if the multiple UEs recognize an emergency situation and attempt emergency broadcast simultaneously, namely if msg1 transmission is simultaneously attempted, collision is unavoidable due to a restriction according to the number of reserved sequences.

<Escaping a Collision Situation by Depending on Cluster Head Scheduling>

Figure 11:
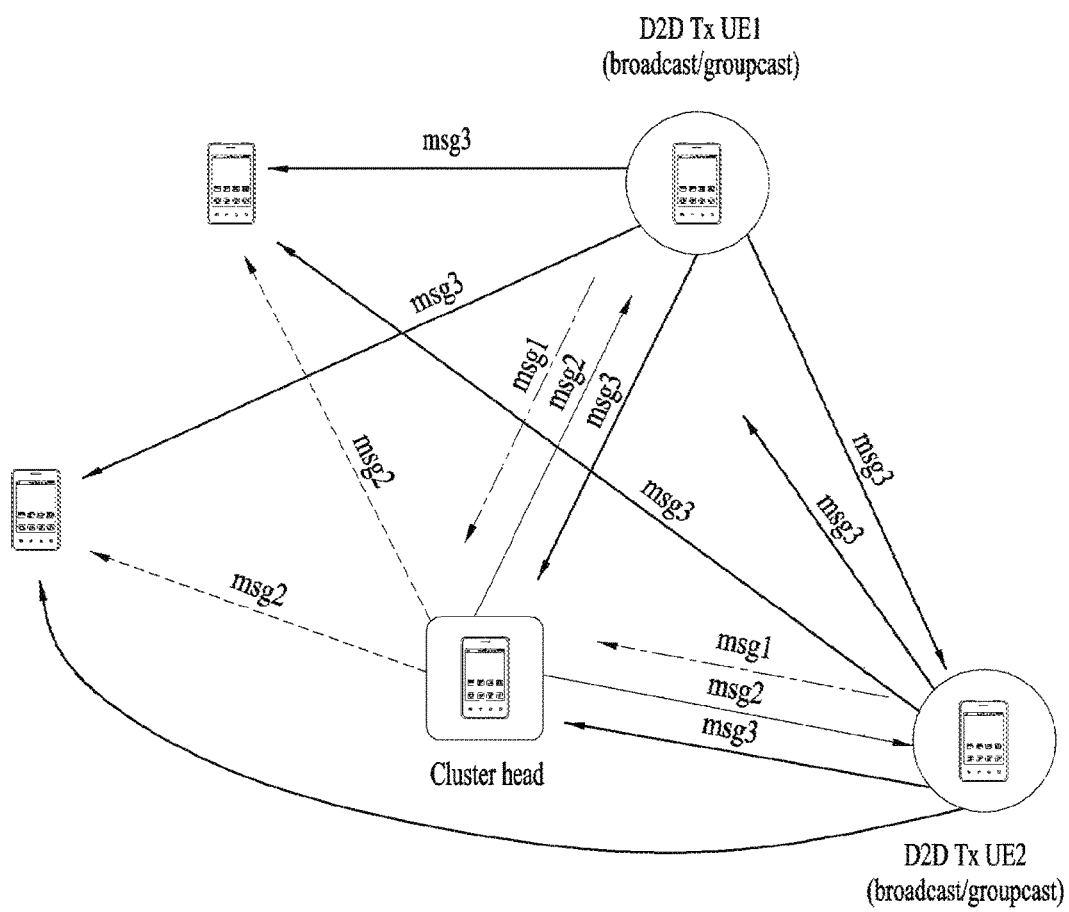
FIGS. 11 and 12 illustrate a situation wherein collision occurs between two or more UEs as the UEs attempt to perform broadcast simultaneously.
Figure 12:
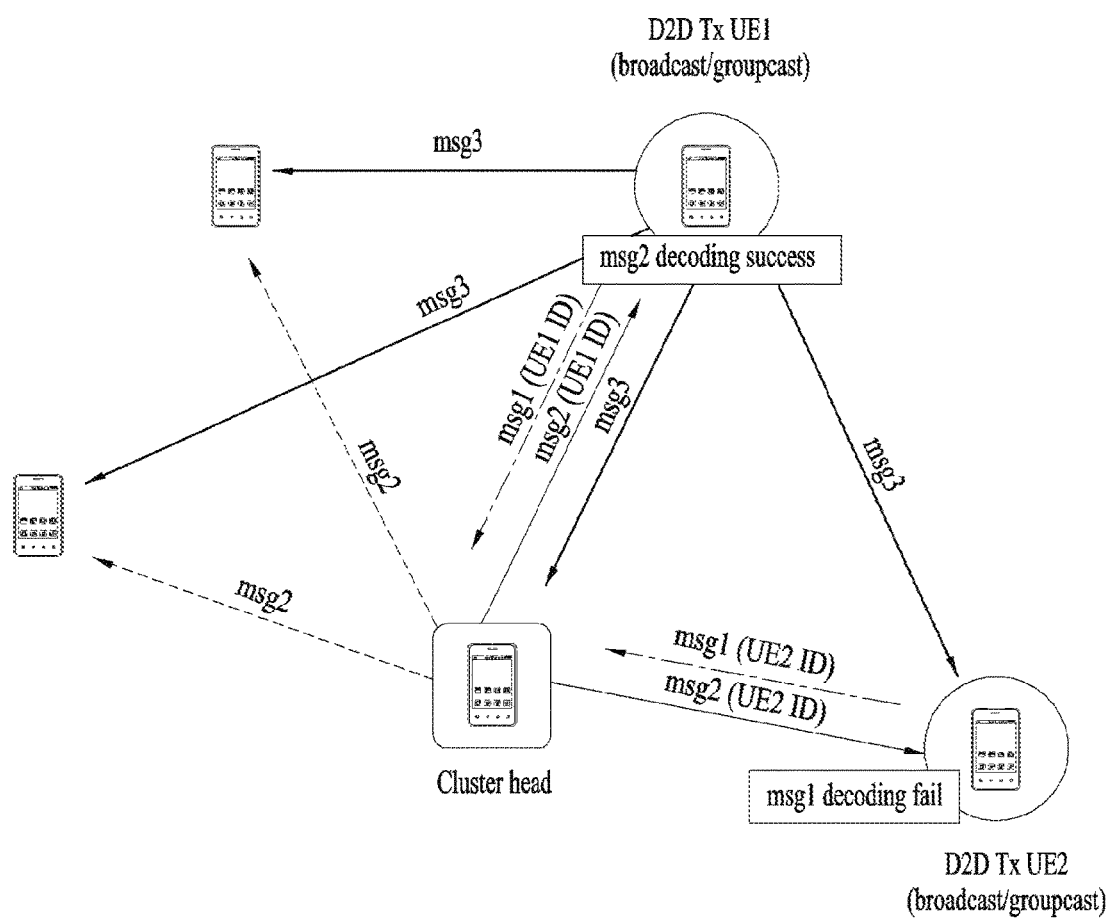

FIGS. 11 and 12 illustrate a situation wherein collision occurs between two or more UEs as the UEs attempt to perform broadcast simultaneously.

FIG. 11 illustrates a situation wherein collision occurs between msg3 messages as UE1 and UE2 attempt to perform D2D broadcast simultaneously. When multiple UEs (e.g., UE1 and UE2) transmit msg1, a cluster head may serve to select a UE from among the multiple UEs. Alternatively, a UE may select a significance level and send the same to the cluster head, and the cluster head may in turn determine a corresponding priority based on the significance level. However, if multiple UEs set the highest significance level and transmit the same, it is not easy to select a UE. Accordingly, there is a need for a method to handle broadcast message transmission requests received from multiple UEs. The most intuitive method is to provide information about fairness between UEs. For example, a UE frequently making a request may be assigned a low priority, while a UE that does not frequently make a request may be assigned a high priority. In other words, a kind of priority counter may be provided to persistently count and release requests from the UEs.

As another method, if a UE attempts but fails to make a broadcast message request, the time for a reattempt may be advanced so as to favor the UE over the other UEs. This method increases the probability of selecting the UE by increasing the number of attempts of the UE over time. This method may also be managed using a separate counter. Referring to FIG. 12, when it is assumed that UE1 is selected after UE1 and UE2 transmit msg1 based on UE IDs simultaneously, UE2 may determine occurrence of collision in the step of receiving msg2, thereby avoiding simultaneous transmission of msg3 from UE1 and UE2.

<Escaping a Collision Situation by Becoming a Cluster Head>

Another function that should be implemented is to send a pre-designated message once a specific button of the UE is pressed in an emergency situation. In a situation wherein the cluster head performs scheduling based on contention, transmission of an emergency call may not be guaranteed. UEs may be preconfigured such that contention therebetween does not occur within the coverage. However, it is not easy to prevent contention between UEs outside the coverage because an eNB does not exist outside the coverage. Even if the cluster head partially performs the scheduling function of the eNB, the cluster head is limited in performing the function compared to the eNB and thus it is not easy to prevent contention between UEs. As one method to increase transmission possibility of an emergency call by attenuating contention between UEs, the present invention proposes that the Tx UE become a cluster head to schedule itself to increase possibility of broadcasting. However this method may be limited if the cluster head is determined based on contention. Accordingly, there is a need for a method to allow a UE desiring to be a cluster head in an emergency situation to become the cluster head, in addition to the condition-based determination of the cluster head. According to one method, a UE desiring to become a cluster head broadcasts information indicating that the UE desires to become a cluster head. For example, a Tx UE desiring to become the cluster head may broadcast, in the form of beacon, a cluster head decision/negotiation signal indicating that the UE desires to become a cluster head, thereby becoming a cluster head and preventing other cluster heads and other Rx UEs from becoming cluster heads. If the beacon signal is implemented in the form of a sequence, a specific sequence(s) may be reserved for the aforementioned purpose. The cluster head decision/negotiation signal may contain a priority indicator and/or an emergency situation indicator. If multiple UEs simultaneously declare that the UEs will become cluster heads, this may cause a problem. However, if it is rarely likely that multiple UEs simultaneously declare that they will become cluster heads, the aforementioned method may be useful.

Msg1 may carry a priority indicator and/or an emergency indicator. When the Tx UE transmits msg1, the Tx UE may also deliver information indicating the highest priority through msg1. If collision occurs in this process and thus msg1 is not selected by the cluster head, msg1 including information indicating a UE desiring to become a cluster head may be transmitted along with the information indicating the highest priority. If msg1 is implemented based on UE IDs, better effects may be obtained.

Meanwhile, a cluster head may signal a priority counting value or an approximate value thereof to UEs to induce the UEs to perform other operations.

This method is different from D2D broadcast/groupcast according to scheduling performed by other cluster heads in that a Tx UE desiring to perform D2D broadcast/groupcast becomes a cluster head. Even if there is already a cluster head present in the cluster to which the Tx UE belongs, the Tx UE may become a cluster head. A cluster managed by the Tx UE having become a cluster head may be a new broadcast cluster different from the cluster configured by the existing cluster head, or the Tx UE may perform the function of the existing cluster head. The latter case may correspond to a situation in which the cluster head of a specific cluster is changed. According to this embodiment, a broadcast Tx UE may voluntarily and additionally serve as a cluster head or deprive other cluster heads of positions and disable the functions of the other cluster heads. According to this embodiment, if a UE to perform emergency transmission becomes a cluster head for emergency transmission, transmission efficiency may be enhanced compared to a case where the UE is not allowed to become a cluster head. If the UE to perform emergency transmission is not allowed to become a cluster head, a UE having nothing to transmit may be maintained as a cluster head. In this case, the cluster head may perform only the function of coordinating transmission when collision occurs according to transmission from the UE to perform emergency transmission.

A more detailed description will be given of embodiments of the present invention of a relationship among a UE that voluntarily becomes a cluster head, a cluster (hereafter, broadcast cluster) managed by the UE and the existing cluster. The existing cluster may be maintained/disappear or the status of the existing cluster head may be maintained/stripped, and a new broadcast cluster may be created, according to one of the following methods (1) and (2).

(1) Creation of a New Broadcast Cluster in Place of the Existing Normal Cluster

Once a UE for broadcast becomes a cluster head, a new cluster is created and the existing cluster head around the UE disappears. Since the new cluster head in part belongs to the existing cluster and in part belongs to the new cluster, the existing cluster may be construed as being partially integrated into the new cluster. To make sure that the broadcast Tx UE wins the cluster head contention, conditions under which the Tx UE favorably becomes a cluster head needs to be constantly offered. To this end, various methods may be used. According to one of the methods, in performing cluster head negotiation, information indicating that the Tx UE desiring to transmit a broadcast signal has a higher priority may be exchanged, thereby increasing the chances that the Tx UE will become a cluster head. Herein, if transmission of a broadcast signal is intended, the procedures of msg1 and msg2 may not be needed. This is because the UE only needs to become a cluster head to directly schedule and broadcast a broadcast signal whenever the UE desires to transmit an emergency message. However, in a collision situation in which Tx UEs desiring to become cluster heads coexist, an additional method is needed. If multiple broadcast Tx UEs desire to become cluster heads at the same time, negotiation is needed between the Tx UEs, and the cluster head is determined based on priorities of the Tx UEs. For example, if 'Priority level=2' is preconfigured in the application of Tx UE1 and 'Priority level=4' is preconfigured in the application of Tx UE2, Tx UE1 may become a cluster head by exchanging the priority levels in the negotiation procedure. Herein, in order to prevent a Tx UE from intentionally changing the priority level thereof, the priority level may need to be configured to be unchangeable. The applications having priority levels, which are simply illustrative, assume that, for example, when numbers such as "911" are input or an emergency call button is pressed, a priority level associated therewith is delivered in the negotiation procedure. Preferably, the priority levels are applied only to public disaster applications or public disaster broadcast signals.

In the proposed scheme, the broadcast cluster is a new cluster having only the scheduling function, and information such as a timing reference may be obtained from an existing normal cluster. For example, to temporarily secure only the scheduling function of transmitting a broadcast signal, a Tx UE may intentionally create a broadcast cluster and become a cluster head to transmit the broadcast message. In this case, the existing normal reference may be maintained as a synchronization reference. Thereby, a burden of reestablishment of synchronization due to the broadcast cluster that suddenly appears and disappears may be lessened for cluster UEs.

(2) Creation of a New Broadcast Cluster on Top of the Existing Normal Cluster

A layered broadcast cluster may be formed in an overlay form by a broadcast cluster head which is completely different from the existing cluster head. A broadcast message such as an emergency signal may be directly transmitted by the broadcast cluster formed in this way. In this case, a special purpose such as emergency broadcasting may be achieved only when the broadcast cluster has the highest priority. Accordingly, the broadcast cluster head preferably has a higher authority than the existing cluster head. The broadcast cluster head may transmit, for example, a (emergency) broadcast beacon as desired, namely, with a high (or the highest) priority in the cluster On/Off duration that has been managed by the existing cluster head. Thereby, the broadcast cluster head may deliver information indicating "Now a new cluster will be created or has been created" and, when necessary, information indicating "On/Off duration of the newly created cluster". For example, such information may be broadcast through a beacon or pre-broadcast or may be preconfigured. A UE receiving broadcast beacon should receive a message is transmitted from the new cluster head for the On duration of the new cluster outside the On duration of the existing cluster.

Basic operations of the cluster head which are performed after the cluster head is determined according to the two proposed methods are summarized below.

1) Any UE becomes the cluster head.
2) The cluster head configures a certain interval as an integral for announcing the intention of transmission.
3) A UE having data to send announces the intention of transmission in the corresponding interval and then transmits data.
4) If the Rx UE does not find anything in the interval where the intention has been announced, the Rx UE enters the Off duration.

<A Method for Implementing ACK/NACK in Case of an Error in Msg3>

Transmission of msg3 may or may not require an acknowledgment. For example, when groupcast is performed to implement group communication, a HARQ acknowledgment may be set to be received for a delivered packet. In this case, a target to receive the HARQ acknowledgment and a method to deliver the HARQ acknowledgment need to be determined. Considering point to point HARQ, ACK/NACK may be fed back to the transmitter. Similarly, in the case of a broadcast signal, whether or not reception of the signal is successful may be signaled to the Tx UE.

When M UEs out of N UEs send acknowledgments (M<N or M=N), various methods may be used to combine the ACK/NACK messages to make a final decision. As a simple method, a majority rule may be applied. If the proportion of NACK is less than or equal to a certain percentage, transmission may be considered to be successful. If the proportion is greater than the certain percentage, an operation such as attempting to perform retransmission may be performed. Alternatively, the cluster head may combine ACK/NACK from multiple Rx UEs and deliver a finally determined value to the Tx UE. Herein, the aforementioned method may be implementable when the Tx UE delivers the same packet to the multiple UEs of a group. However, if the Tx UE delivers different packets to different UEs, the HARQ operation is preferably managed individually for respective links.

When the aforementioned method is used, a UE in the idle mode or a UE in a discontinuous reception (DRX) mode may not overhear a broadcast message. Accordingly, when the cluster head receives msg1, the UE in the idle mode may need to be caused to wake up to signal, to the UE, when msg3 will be transmitted. In this case, there may be latency and thus the transmission time of msg3 may need to be determined in consideration of latency. For the legacy RACH, when msg2 is received in the subframe n, msg3 is transmitted in subframe n+k (e.g., k>4 or 5 or 6 or ... ). On the other hand, in the present invention, msg3 needs to be transmitted in consideration of time taken until the UE in the idle mode can overhear the message. To reduce the latency and efficiently operate D2D communication, new paging with lowered latency may be introduced for a D2D enabled UE.

<Necessity of Msg4 for Handling Collision of Msg3>

When reception of msg3 fails outside the coverage, the Rx UE needs to make a response thereto. When transmitted msg3 consists of a control part (PDCCH) and a data part (PDSCH), msg3 reception failure may be classified into a case of an error in the control part (PDCCH/EPDCCH) and a case of an error in the data part (PDSCH/PUSCH). Herein, the HARQ operation is applicable to the data part. To simplify the system, the only the case of an error in the control part may be considered. If checking the cyclic redundancy check (CRC) for the control part is successful, ACK may be fed back. If the checking fails, NACK may be fed back. For example, the Rx UE may perform CRC checking for the control part (PDCCH or EPDCCH) masked based on a virtual ID and feed back ACK or NACK according to the result of CRC checking. A message used for a feedback signal is called msg4. That is, in this embodiment, msg4 is used as alternative information for checking if msg3 reception is successful. Thereby, msg4 is used to determine not only whether the control part is received but also whether the data part is received. Of course, successful reception of the control part does not guarantee successful reception of the data part. However, it is expected that the probability of reception of the control part will be similar to that of reception of the data part in most cases. Accordingly, error checking may be sufficiently performed based on the control part alone.

Next, the data part (e.g., PDSCH or PUSCh carrying msg3) may not be decoded and thus an error may occur. In this case, msg4 may be used to finally signal whether or not decoding is successful. For broadcast and groupcast, however, it may not be necessary to check final information acquisition. That is, management of broadcast or groupcast may be sufficiently performed even if only delivery of control information such as the control part (PDCCH/EPDCCH) is checked and an acknowledgment is sent based on the checking.

In checking the control part error, control information in a format different from that of PDCCH/EPDCCH may be delivered. Further, the control part may be configured in the format of a preamble and a message, and may employ a basic configuration unit (e.g., a resource element group (REG), a control channel element (CCE), an enhanced CCE (e CCE), an aggregation method and a mapping method which are different from those for the PDCCH/EPDCCH.

Msg4 may also be needed for communication outside the network. Msg4 may be used outside the network at least in order to determine whether or not the aforementioned collision of msg3 occurs. For D2D communication outside the network, whether msg4 needs a function to check successful decoding of msg3 depends on the case. For example, the virtual ID described above or an equivalent ID may be used to transmit, through msg4, a signal indicating only whether msg3 has been correctly detected. If control information (e.g., information including a modulation and coding scheme (MCS) or a new data indicator (NDI)) is separately encoded in msg3, the Tx UE ID may also be included in msg3.

For reference, since there are multiple receivers of msg3 outside the network, msg3 collision may have a different meaning from the convention cases. For example, when UE1, UE2, UE3, UE4 and UE5 are arranged in this order, if UE1 and UE5 transmit msg3 on the same resource simultaneously, each of UE2 and UE4 may successfully receive msg3 from either UE1 or UE5 that is close thereto, while UE3 may fail to receive msg3 from both UE1 and UE5.

Figure 13:
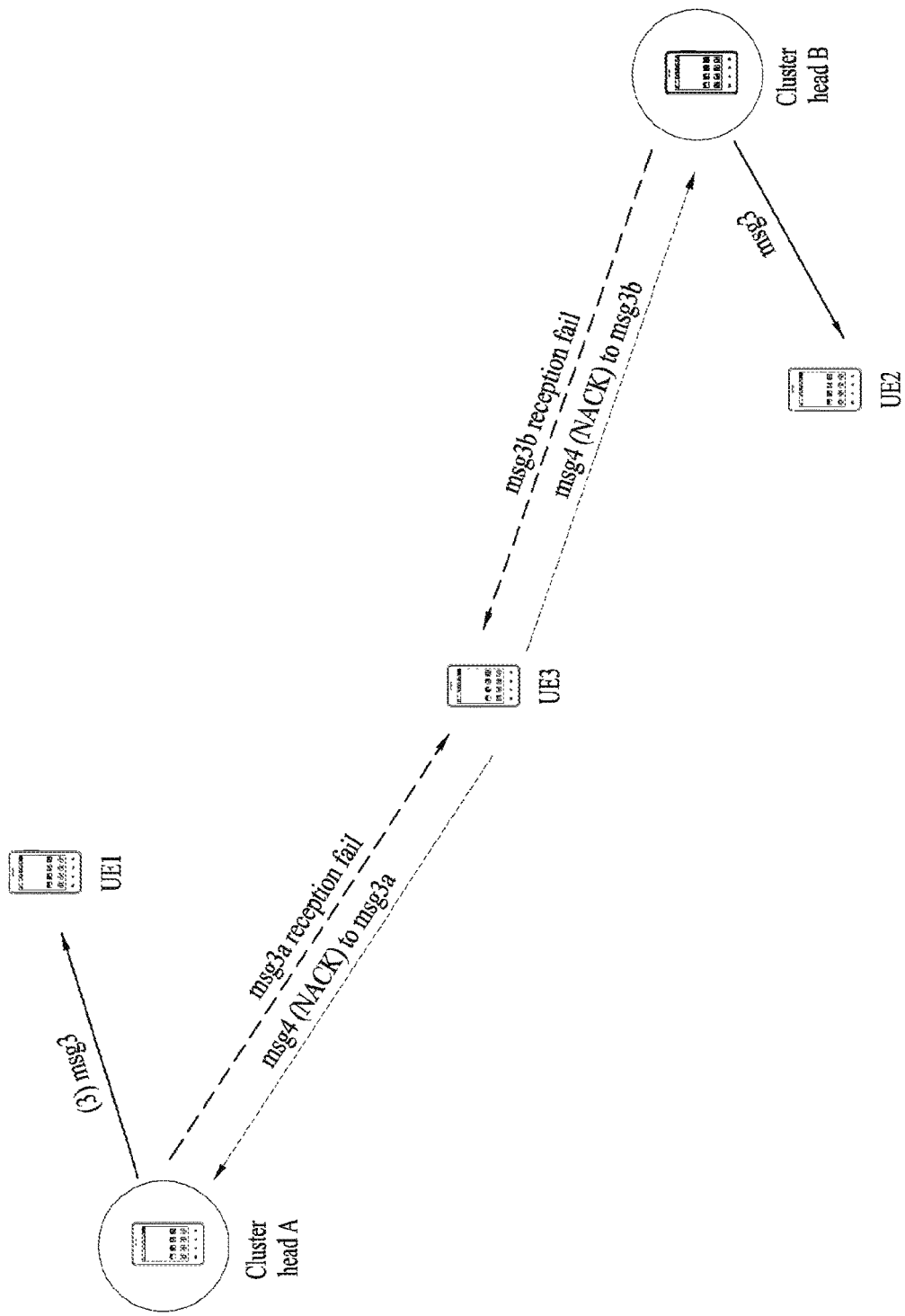
FIG. 13 illustrates exemplary utilization of msg4 for receiving multiple msg3 messages.

FIG. 13 illustrates exemplary utilization of msg4 for receiving multiple msg3 messages.

Referring to FIG. 13, when multiple Tx UEs perform broadcast and multiple Rx UEs receive broadcast signals, UE3 may redundantly receive msg3 messages since msg3 is transmitted from two Tx UEs simultaneously. As a result, UE3 may fail to properly receive msg3. In this case, when it is assumed that UE3 recognizes presence of cluster head A and cluster head B, UE3 may transmit msg4 to report NACK for both msg3 messages. In this embodiment, it is assumed that UE3 which is accurately aware of the timing of reception of msg3 from both cluster heads is capable of recognizing collision caused by simultaneous transmission of msg3 when the msg3 reception times coincide. In this case, msg4 may be fed back in a manner that NACK is scrambled with a cluster head UE ID or virtual ID and then transmitted.

Partial Network Coverage

Hereinafter, description will be given of D2D communication implemented in the situation of partial network coverage when the broadcast Tx UE is within the coverage and when the broadcast Tx UE is outside the coverage.

Figure 14:
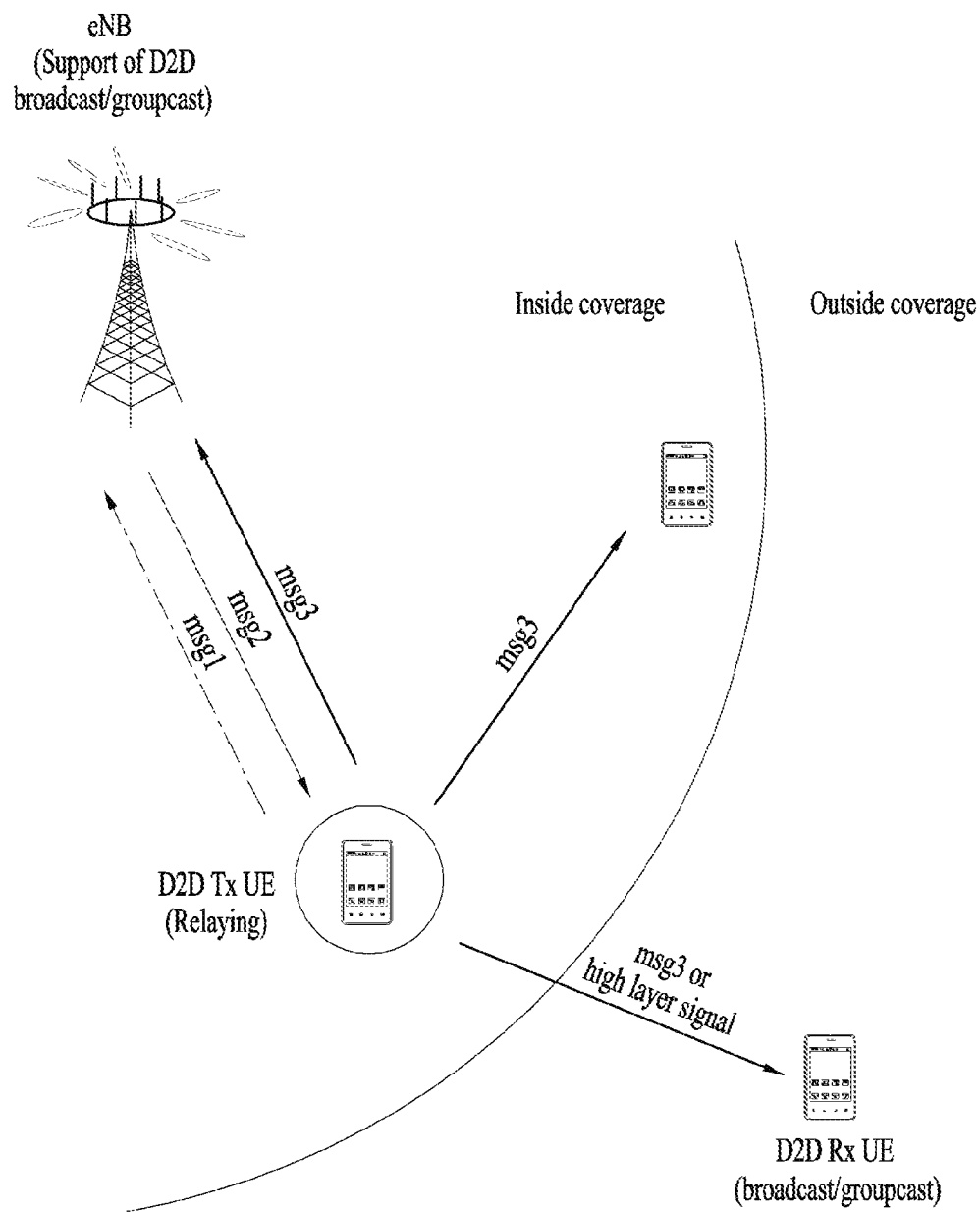
FIGS. 14, 15, and 16 illustrate D2D communication under partial network coverage.
Figure 15:
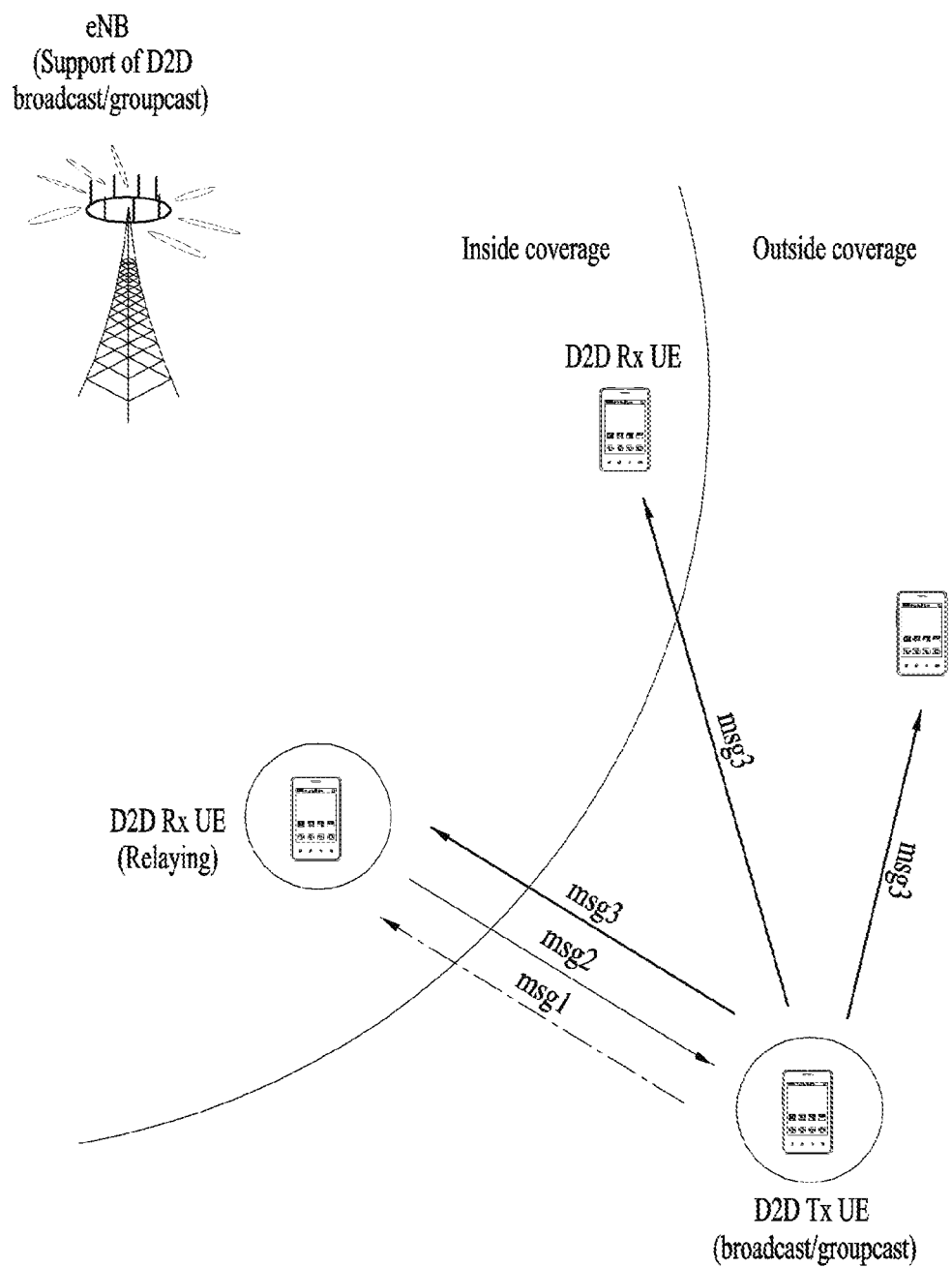
Figure 16:
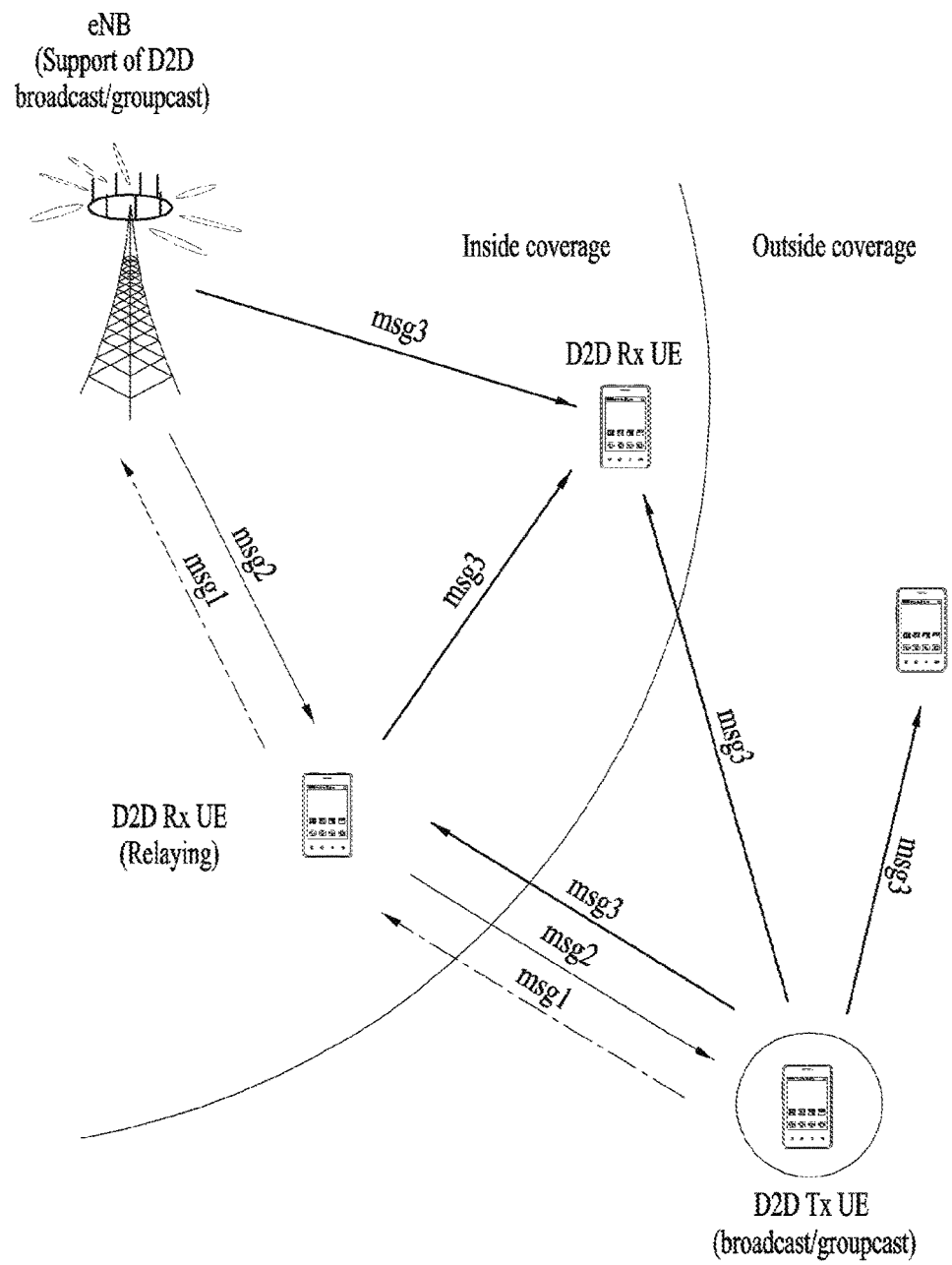

FIGS. 14 to 16 illustrate D2D communication under partial network coverage. Specifically, FIG. 14 illustrates a case where a D2D broadcast UE is positioned within the coverage, and FIGS. 15 and 16 illustrate a case where the D2D broadcast UE is positioned outside the coverage.

Referring to FIG. 14, since the D2D broadcast Tx UE within the coverage, simply referred to as a Tx UE, has a connection with an eNB, the Tx UE may signal that the UE is in an emergency situation and secure a resource on which transmission of a broadcast signal is possible. For example, the Tx UE may signal the emergency situation by performing transmission using a resource or preamble index reserved when msg1 was transmitted. In addition, the Tx UE may be assigned a resource through msg2, and transmit msg3. Thereby, the Tx UE may send an emergency message without suffering collision or latency.

Referring to FIG. 15, in the case where the D2D Dixie UE is outside the coverage, when it is assumed that the Tx UE is basically provided with a relay service from a UE within the network, it may be assumed that the coordination operation is substantially performed by the eNB since synchronization operates based on the network and, when necessary, requests can be delivered via the relay node. Accordingly, when the D2D Tx UE is outside the coverage in the situation of partial network coverage, broadcast messages msg1, msg2 and msg3 may be sequentially delivered in this order, which is similar to the operation performed when the D2D Tx UE is within the coverage. In contrast with the case where all UEs participating in D2D communication are positioned within the coverage, the Tx UE delivers msg1 to the eNB via the relay UE.

Referring to FIG. 16, msg3 initiated by the Tx UE positioned outside the coverage may reach the relay UE, and the relay UE may in turn serve to relay msg3 that has been broadcast. The eNB may also participate in relaying msg3 when msg3 is delivered all the way to the eNB.

Figure 17:
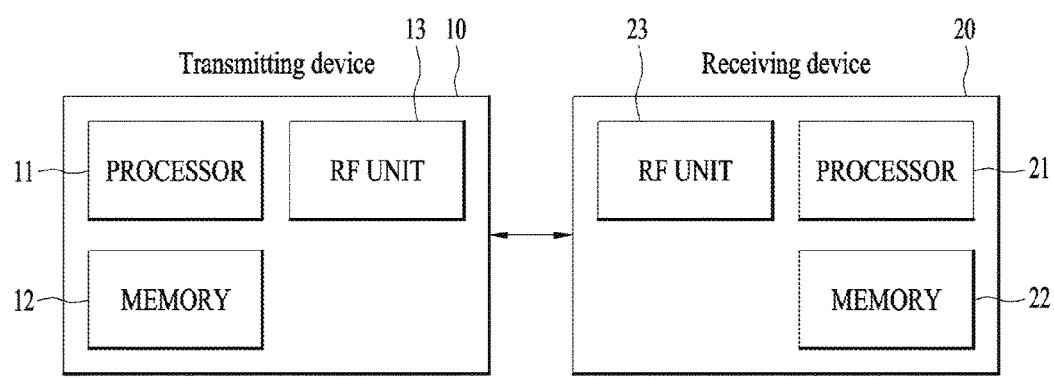
FIG. 17 is a block diagram illustrating elements of a transmitting device 10 and a receiving device 20 for implementing the present invention.

FIG. 17 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into Nlayer layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor of a D2D Tx UE having a D2D signal to transmit may control the D2D Tx UE RF unit to generate a request for resource assignment for transmission of the D2D signal to a UE configured as a cluster head and to transmit msg1 containing the resource assignment request. The D2D Tx UE processor may control the D2D Tx UE RF unit to receive msg2 containing control information necessary for transmission of the D2D signal. The D2D Tx UE processor may control the D2D Tx RF unit to broadcast or groupcast msg3 containing the D2D signal based on msg2 or the control information. In some cases, the D2D Tx UE processor may control the D2D Tx UE RF unit to receive a HARQ acknowledgment of msg3.

The D2D Tx UE processor having a D2D signal to transmit may become a cluster head to schedule a resource for transmission of msg3. The D2D Tx UE processor may control the D2D Tx UE RF unit to broadcast a cluster head decision/negotiation signal containing information corresponding to the intention of becoming a cluster head. The cluster head decision/negotiation signal may contain an indicator indicating that the D2D signal has the highest priority, and a priority level indicator and/or an emergency call indicator that correspond to an emergency call. The D2D Tx UE processor may perform scheduling for transmission of the D2D signal. For example, the D2D Tx UE processor having become the cluster head may determine radio resources such as time, frequency and/or power for transmission of the D2D signal. The D2D Tx UE processor having become the cluster head may control the D2D Tx UE RF unit to transmit a signal or message (e.g., msg2) contain information indicating the radio resources. The D2D Tx UE processor may set the range of the UE cluster for broadcast of the D2D signal, and control the D2D Tx UE RF unit to transmit information about the range of the UE cluster. The D2D Tx UE processor may determine an On duration or Off duration of the UE cluster, and control the D2D Tx UE RF unit to transmit information indicating the On/Off duration. The D2D Tx UE processor may control the D2D Tx RF unit to transmit msg3 including the D2D signal using the radio resources.

The UE processor of a D2D Rx UE may control the RF unit of the D2D Rx UE to monitor or detect msg2. The D2D Rx UE processor may control the D2D Rx UE RF unit to receive msg3 including a D2D signal based on msg2 or control information contained in msg2. The D2D Rx UE processor may perform CRC checking for the control part (PDCCH/EPDCCH) for reception of msg3. If CRC checking is successful, the D2D Rx UE processor may control the D2D Rx UE RF unit to transmit ACK. If CRC checking fails, the D2D Rx UE processor may control the D2D Rx UE RF unit to transmit NACK.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

What is claimed is:

1. A method for broadcasting a device-to-device (D2D) signal by a user equipment (UE) positioned outside a coverage of a base station (BS), the method comprising:
transmitting a first message including a preamble sequence to a first D2D UE in a cluster, wherein an index of the preamble sequence is determined based on a resource used for transmission of the first message;
receiving a second message from the first D2D UE in the cluster as a response to the first message, wherein the second message contains scheduling information to broadcast a third message;
broadcasting the third message in the D2D signal to a plurality of D2D UEs in the cluster based on the scheduling information;
receiving a plurality of ACK/NACKs (acknowledgement/negative-acknowledgements) for the third message from the plurality of D2D UEs in the cluster; and
re-broadcasting the third message in a D2D signal to the plurality of D2D UEs in the cluster if a proportion of NACK among the plurality of ACK/NACKs is equal to or larger than a certain value.

2. The method according to claim 1, further comprising:
receiving, before transmitting the first message, a cluster head decision signal from the first D2D UE,
wherein the cluster head decision signal contains a priority level of the first D2D UE to become the cluster head of the cluster.

3. The method according to claim 1, further comprising:
receiving information announcing generation of the cluster.

4. The method according to claim 1, further comprising:
receiving On or Off duration information of the cluster.

5. A user equipment (UE) for broadcasting a device-to-device (D2D) signal while being positioned outside a coverage of a base station (BS), and comprising:
a radio frequency (RF) unit and a processor,
wherein the processor is configured to control the RF unit to:
transmit a first message including a preamble sequence to a first D2D UE in a cluster, wherein an index of the preamble sequence is determined based on a resource used for transmission of the first message;
receive a second message from the first D2D UE in the cluster as a response to the first message, wherein the second message contains scheduling information to broadcast a third message;
broadcast the third message in the D2D signal to a plurality of D2D UEs in the cluster based on the scheduling information;
receive a plurality of ACK/NACKs (acknowledgement/negative-acknowledgements) for the third message from the plurality of D2D UEs in the cluster; and
re-broadcast the third message in a D2D signal to the plurality of D2D UEs in the cluster if a proportion of NACK among the plurality of ACK/NACKs is equal to or larger than a certain value.

6. The UE according to claim 5,
the processor is further configured to control the RF unit to:
receive, before transmitting the first message, a cluster head decision signal from the first D2D UE,
wherein the cluster head decision signal contains a priority level of the first D2D UE to become the cluster head of the cluster.

7. The UE according to claim 5,
the processor is further configured to control the RF unit to:
receive information announcing generation of the cluster.

8. The UE according to claim 5,
the processor is further configured to control the RF unit to:
receive On or Off duration information of the cluster.

* * * * *